United States Patent
Chiang et al.

(10) Patent No.: US 10,733,332 B2
(45) Date of Patent: Aug. 4, 2020

(54) SYSTEMS FOR SOLVING GENERAL AND USER PREFERENCE-BASED CONSTRAINED MULTI-OBJECTIVE OPTIMIZATION PROBLEMS

(71) Applicant: Bigwood Technology, Inc., Ithaca, NY (US)

(72) Inventors: Hsiao-Dong Chiang, Ithaca, NY (US); Shuo Wang, Tianjin (CN)

(73) Assignee: Bigwood Technology, Inc., Ithaca, NY (US)

( * ) Notice: Subject to any disclaimer, the term of this patent is extended or adjusted under 35 U.S.C. 154(b) by 521 days.

(21) Appl. No.: 15/616,959

(22) Filed: Jun. 8, 2017

(65) Prior Publication Data

US 2018/0357335 A1    Dec. 13, 2018

(51) Int. Cl.
*G06F 30/00* (2020.01)
*G05B 13/02* (2006.01)
(Continued)

(52) U.S. Cl.
CPC ........... *G06F 30/00* (2020.01); *G05B 13/024* (2013.01); *G05B 13/042* (2013.01); *G06F 1/00* (2013.01); *G06F 17/11* (2013.01); *G06F 30/20* (2020.01); *G06Q 10/04* (2013.01); *H04L 67/306* (2013.01); *G06F 2111/06* (2020.01)

(58) Field of Classification Search
CPC ........ G06F 17/50; G06F 17/5009; G06F 1/00; G06F 17/11; G06F 2217/08; G06Q 10/04; G05B 13/042; G05B 13/024; H04L 67/306
See application file for complete search history.

(56) References Cited

U.S. PATENT DOCUMENTS 7,181,702 B2 * 2/2007 Horn .................. G06F 17/50
716/132
7,363,280 B2    4/2008 Jin et al.
(Continued)

OTHER PUBLICATIONS

Cho et al. "A Survey on Modeling and Optimizing Multi-Objective Systems" IEEE Communications Surveys and Tutorials, vol. 19, No. 3, pp. 1867-1901, [published May 2, 2017] [retrieved on Oct. 29, 2019]. Retrieved from <https://ieeexplore.ieee.org/document/7917236> (Year: 2017).*

(Continued)

*Primary Examiner* — Rehana Perveen
*Assistant Examiner* — Alfred H B Wechselberger
(74) *Attorney, Agent, or Firm* — Tong J. Lee

(57) ABSTRACT

A user-preference-enabling (UPE) method optimizes operations of a system based on user preferences. The operations of the system are modeled as a user-preference-based multi-objective optimization (MOO) problem having multiple object functions subject to a set of constraints. The set of constraints include system constraints and a wish list specifying a respective user-preferred range of values for one or more of the objective functions. The UPE method calculates a wish list feasible solution (WL-feasible solution) to the user-preference-based MOO problem. The UPE method can be performed iteratively to compute targeted Pareto-optimal solutions. The UPE method can be used in a hybrid method in combination with other numerical methods to reliably compute feasible solutions of both conventional MOO problems and user-preference-based MOO problems.

27 Claims, 13 Drawing Sheets

(51) Int. Cl.
*G06F 17/11* (2006.01)
*G06Q 10/04* (2012.01)
*G05B 13/04* (2006.01)
*G06F 30/20* (2020.01)
*G06F 111/06* (2020.01)
*G06F 1/00* (2006.01)
*H04L 29/08* (2006.01)

(56) References Cited

U.S. PATENT DOCUMENTS

| | | | |
|---|---|---|---|
| 7,996,344 | B1 | 8/2011 | Goel |
| 2002/0099929 | A1 | 7/2002 | Jin et al. |
| 2005/0177530 | A1 | 8/2005 | Jin et al. |
| 2007/0088530 | A1* | 4/2007 | Erignac ............... G06F 17/5009 703/1 |
| 2007/0239497 | A1* | 10/2007 | Fertig ................... G06Q 10/04 705/7.11 |
| 2008/0094250 | A1 | 4/2008 | Myr |
| 2010/0030594 | A1 | 2/2010 | Swart |
| 2012/0303560 | A1* | 11/2012 | Sedaghat ................ G06N 7/02 706/13 |
| 2017/0343984 | A1* | 11/2017 | Czinger ................ B33Y 50/02 |
| 2018/0183152 | A1* | 6/2018 | Turpin ................... H01Q 1/288 |

OTHER PUBLICATIONS

Jia et al. "Dynamic Multi-objective Differential Evolution for Solving Constrained Optimization Problem" 2011 IEEE Congress of Evolutionary Computation; doi:10.1109/CEC.2011.5949949 [retrieved on Nov. 2, 2019]. Retrieved from <https://ieeexplore.ieee.org/document/5949949> (Year: 2011).*

Hakanen et al. "Connections of Reference Vectors and Different Types of Preference Information in Interactive Multiobjective Evolutionary Algorithms" 2016 SSCI, Greece; doi: 10.1109/SSCI.2016.7850220 [retrieved on Nov. 4, 2019]. Retrieved from <https://ieeexplore.ieee.org/document/7850220> (Year: 2016).*

Lee et al. "Quotient Gradient Methods for Solving Constraint Satisfaction Problems" ISCAS 2001, Australia; DOI: 10.1109/ISCAS.2001.921323 [retrieved Oct. 30, 2019]. Retrieved from <https://ieeexplore.ieee.org/document/921323> (Year: 2001).*

Wang et al. "Multi-objective service restoration of distribution systems using user-centered methodology" Electrical Power and Energy Systems, vol. 80, pp. 140-149 [retrieved on Oct. 30, 2019]. Retrieved from <https://www.sciencedirect.com/science/article/pii/S0142061516000338> (Year: 2016).*

Ismail-Yahaya et al. "Effective Generation of the Pareto Frontier: The Normalized Normal Constraint Method" 43rd AIAA/ASME/ASCE/AHS/ASC Conference, Colorado; https://doi.org/10.2514/6.2002-1232 [retrieved on Nov. 4, 2019]. Retrieved from <https://arc.aiaa.org/doi/abs/10.2514/6.2002-1232> (Year: 2012).*

Patnaik et al. "Diversity Improvement of Solutions in Multiobjective Genetic Algorithms Using Pseudo Function Inverses" 2011 IEEE Int. Conf. on Sys., Man and Cybernetics; DOI: 10.1109/ICSMC.2011.6084009 [retrieved on Nov. 3, 2019]. Retrieved from <https://ieeexplore.ieee.org/document/6084009/> (Year: 2011).*

Zavala et al. "A survey of multi-objective metaheuristics applied to structural optimization" Structural and Multidisciplinary Optimization, vol. 49, Iss. 4, pp. 537-558 [retrieved on Nov. 3, 2019]. Retrieved from <https://link.springer.com/article/10.1007/s00158-013-0996-4> (Year: 2014).*

Lee et al. "Theory of Stability Regions for a Class of Nonhyperbolic Dynamical Systems and Its Application to Constraint Satisfaction Problems" IEEE Tran. on Circuits and Systems I, vol. 49, No. 2 [retrieved on Oct. 29, 2019]. Retrieved from <http://ieeexplore.ieee.org/document/983867/> (Year: 2002).*

Chiang et al. "Stability Regions of Nonlinear Dynamical Systems Theory, Estimation, and Applications" Chp. 7, 13, 18, 20; Cambridge Univ. Press [retrieved on May 22, 2020]. Retrieved from STIC. (Year: 2015).*

Deb, et al., A Fast and Elitist Multiobjective Genetic Algorithm: NSGA-II, IEEE Trans. on Evolutionary Computation, vol. 6, No. 2, Apr. 2002, pp. 182-197.

Li, et al., Interrelationship-Based Selection for Decomposition Multiobjective Optimization, IEEE Trans. on Cybernetics, vol. 45, No. 10, Oct. 2015, pp. 2076-2088.

Hu, et al., Calculating Complete and Exact Pareto Front for Multiobjective Optimization: A New Deterministic Approach for Discrete Problems, IEEE Trans. on Cybernetics, vol. 43, No. 3, Jun. 2013, pp. 1088-1101.

Chen, et al., An Evolutionary Algorithm with Double-Level Archives for Multiobjective Optimization, IEEE Trans. on Cybernetics, vol. 45, No. 9, Sep. 2015, pp. 1851-1863.

Daneshyari, et al., Cultural-Based Multiobjective Particle Swarm Optimization, IIEEE Trans. on Systems, Man, and Cybernetics—Part B: Cybernetics, vol. 41, No. 2, Apr. 2011, pp. 553-567.

* cited by examiner

SYSTEMS FOR SOLVING GENERAL AND USER PREFERENCE-BASED CONSTRAINED MULTI-OBJECTIVE OPTIMIZATION PROBLEMS

TECHNICAL FIELD

Embodiments of the invention pertain to large-scale multi-objective optimization problems that arise in engineering and the science.

BACKGROUND

Over the past several decades, significant efforts have been directed toward solving constrained multiple objective optimization (MOO) problems. Meanwhile, MOO problem formulations have found their practical applications in many engineering areas; for example, engineering applications, energy and power grids, VLSI design, finance, vehicle routing problems, and machine learning, to name a few.

Many MOO methods, such as population-based meta-heuristics, including NSGA-II [1], MOEA/D [2], the deterministic method [3], MOEA-DLA [4], and cultural MOPSO [5], have been proposed to solve MOO problems with the focus of computing the entire Pareto front. However, from application perspectives, MOO decision makers (users) may not always be interested in knowing the entire Pareto front of a MOO problem. Instead, they may have their own wish list regarding the range of each objective function.

The following publications describe some of the existing MOO methods, which are incorporated herein by reference.
[1] K. Deb, A. Pratap, S. Agarwal, and T. Meyarivan, "A fast and elitist multi-objective genetic algorithm: NSGA-II," IEEE Trans. on Evolutionary Computation, vol. 6, no. 2, pp. 182-197, April 2002.
[2] K. Li, S. Kwong, Q. Zhang and K. Deb, "Interrelationship-Based Selection for Decomposition Multiobjective Optimization," in IEEE Trans. on Cybernetics, vol. 45, no. 10, pp. 2076-2088, October 2015.
[3] X. B. Hu, M. Wang and E. Di Paolo, "Calculating Complete and Exact Pareto Front for Multiobjective Optimization: A New Deterministic Approach for Discrete Problems," in IEEE Trans. on Cybernetics, vol. 43, no. 3, pp. 1088-1101, June 2013.
[4] N. Chen et al., "An Evolutionary Algorithm with Double-Level Archives for Multiobjective Optimization," in IEEE Trans. on Cybernetics, vol. 45, no. 9, pp. 1851-1863, September 2015.
[5] M. Daneshyari and G. G. Yen, "Cultural-Based Multiobjective Particle Swarm Optimization," in IEEE Trans. on Systems, Man, and Cybernetics, Part B (Cybernetics), vol. 41, no. 2, pp. 553-567, April 2011.

SUMMARY

In one embodiment, a computer-implemented user-preference-enabling (UPE) method is provided to optimize operations of a system based on user preferences. The UPE method comprises: modeling the operations of the system as a user-preference-based multi-objective optimization (MOO) problem having multiple object functions subject to a set of constraints. The set of constraints include system constraints and a wish list specifying a respective user-preferred range of values for one or more of the objective functions. The UPE method further comprises: calculating a wish list feasible solution (WL-feasible solution) to the user-preference-based MOO problem.

In another embodiment, a computer-implemented hybrid method is provided to optimize operations of a system. The hybrid method comprises: modeling the operations of the system as a MOO problem having multiple object functions subject to a set of constraints; and applying a population-based meta-heuristic MOO method with a population of candidate solutions to the MOO problem until groups of the population are formed. The hybrid method further comprises: for each of selected candidate solutions from each group, applying a feasible solution solver to calculate a corresponding feasible solution to the MOO problem with the selected candidate solution being an initial vector; and applying a deterministic solver to corresponding feasible solutions for the selected candidate solutions to obtain a Pareto optimal solution. The Pareto-optimal solution optimizes the multiple objective functions and satisfies the set of constraints.

In yet another embodiment, a computing system is provided for optimizing operations of a system based on user preferences. The computing system comprises one or more processors and memory. The one or more processors are operative to model the operations of the system as a user-preference-based MOO problem having multiple object functions subject to a set of constraints. The set of constraints include system constraints and a wish list specifying a respective user-preferred range of values for one or more of the objective functions. The one or more processors are further operative to calculate a WL-feasible solution to the user-preference-based MOO problem. The memory is coupled to the one or more processors to store the set of constraints.

In yet another embodiment, a computing system is provided to perform a hybrid method for optimizing operations of a system. The computing system comprises one or more processors and memory. The one or more processors are operative to model the operations of the system as a MOO problem having multiple object functions subject to a set of constraints; and apply a population-based meta-heuristic MOO method to the MOO problem with a population of candidate solutions until groups of the population are formed. The one or more processors are further operative to: for each of selected candidate solutions from each group, calculate a corresponding feasible solution to the MOO problem with the selected candidate solution being an initial vector; and apply a deterministic solver to corresponding feasible solutions for the selected candidate solutions to obtain a Pareto optimal solution. The Pareto-optimal solution optimizes the multiple objective functions and satisfies the set of constraints. The memory is coupled to the one or more processors to store the set of constraints.

Other aspects and features will become apparent to those ordinarily skilled in the art upon review of the following description of specific embodiments in conjunction with the accompanying figures.

DETAILED DESCRIPTION

Figure 1A:
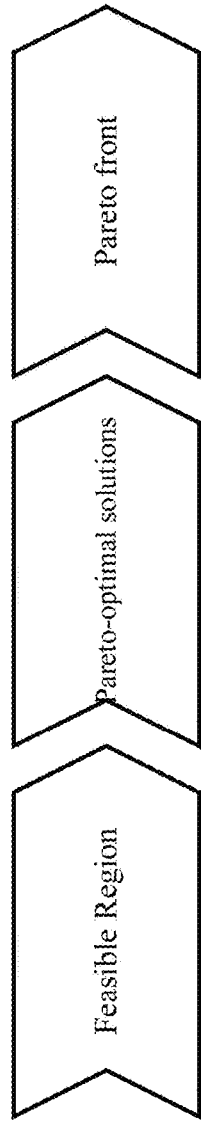
FIG. 1A illustrates an overall concept for solving a conventional MOO problem.

In the following description, numerous specific details are set forth. However, it is understood that embodiments of the invention may be practiced without these specific details. In other instances, well-known techniques have not been shown in detail to prevent obscuring the understanding of this description. Someone skilled in the art will appreciate the fact that the invention may be practiced without such specific details. Those of ordinary skill in the art, with the included descriptions, will be able to implement appropriate functionality without undue experimentation.

From the user's perspective, a targeted Pareto front based on the users' preference may be preferred. Allowing users to directly place a preferred range over different objective functions is appealing. To this end, this disclosure introduces the user wish list, which explicitly incorporates users' preferred range of objective function values into the MOO problem to formulate a user preference-based MOO problem. The feasible region in the decision space (i.e., the search space) satisfying both the user wish list and all the constraints is termed the user preference-based feasible region (also referred to as the wish-list feasible region or the WL-feasible region). The Pareto-optimal solutions, whose objective vectors lie within a user-preferred range, are called user preference-based Pareto-optimal solutions or targeted Pareto-optimal solutions.

In this disclosure, we present a novel user preference enabling (UPE) method to solve user preference-based problems and then extend the UPE method to solve general constrained MOO problems. The theoretical basis of the UPE method is developed. Complete characterizations of both the feasible region and the WL-feasible region of MOO problems are developed. The user preference enabling method is capable of obtaining Pareto-optimal solutions by sequentially computing user preference-based feasible solutions. It is noted that the UPE method can solve general constrained MOO problems and can also assist existing methods in solving MOO problems, in the sense that it provides feasible solutions and/or wish-list feasible solutions (WL-feasible solutions). An illustration of its practical application is the optimal power flow (OPF) problem in power systems.

Furthermore, most existing methods encounter challenges in finding feasible solutions for constrained MOO problems, especially when incorporating the preference constraints into many objective problems. Hence, the majority of MOO methods limit their approach within bi-objective problems. This disclosure also presents a (numerical) trajectory-unified (TJU) method, also referred to as a hybrid method, to reliably compute feasible solutions of both conventional MOO problems and user preference-based MOO problems with the following features: (1) The hybrid method is general and insensitive to the number of objective functions. (2) The hybrid method can quickly calculate a feasible solution in a deterministic and robust way. (3) The hybrid method has a solid theoretical foundation. (4) While the convergence regions of many numerical methods, such as the Newton method, are disconnected and fractal, the convergence region of the hybrid method is connected and smooth.

A hybrid framework has been proposed that integrates the user preference enabling method into existing methods to effectively solve the targeted Pareto Front as well as the conventional Pareto Front in MOO problems.

Figure 1B:
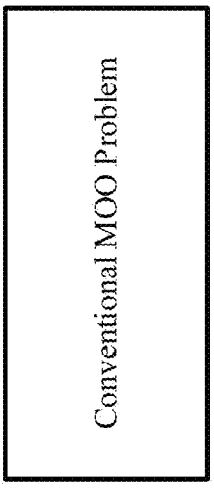
FIG. 1B illustrates an overall concept for solving a user preference-based MOO problem according to one embodiment.
Figure 1B:
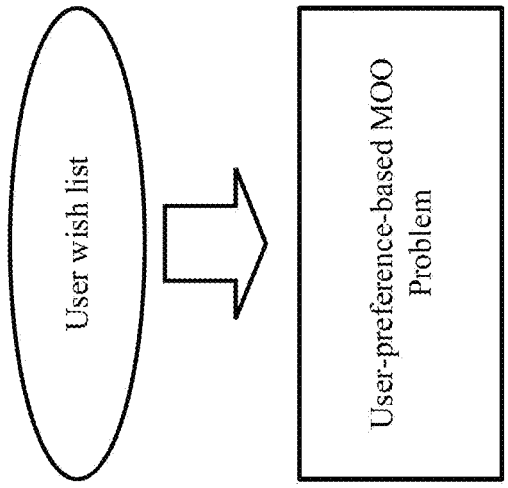

FIG. 1A illustrates an overall concept for solving a conventional MOO problem, and FIG. 1B illustrates an overall concept for solving a user preference-based MOO problem according to one embodiment.

Without loss of generality, we consider the following multi-objective optimization problem with equality and inequality constraints:

$$\min_{u \in R^n} F(u, x) = [f_1(u, x), \ldots, f_l(u, x)] \quad (1)$$

$$\text{s.t.} \quad \begin{aligned} h_i(u, x) &= 0 \quad i \in I = \{1, \ldots, I\} \\ g_j(u, x) &\leq 0 \quad j \in J = \{1, \ldots, J\} \end{aligned}$$

where $u \in \mathbb{R}^n$ is the control variable, $x \in \mathbb{R}^m$ is the state variable, $f \in \mathbb{R}^\ell$ is the objective vector, and $F: \mathbb{R}^n \times \mathbb{R}^m \mapsto \mathbb{R}^\ell$ consists of $l$ real-valued objective functions. For practical applications, control variables are adjustable while state variables are dependent on the control variables governed by the constraints. The MOO problem (1) is to determine a set of Pareto-optimal control vectors u that optimize F(u, x) and satisfy all the equality constraints H(u,x) and inequality constraints G(u,x). Hence, (1) can be compactly represented as follows:

$$\underset{u \in R^n}{\text{minimize}}\, F(u, x) = [f_1(u, x), \ldots, f_l(u, x)] \quad (2)$$

$$H(u, x) = 0$$

$$G(u, x) \le 0$$

A user preference enabling (UPE) method is provided for solving general constrained nonlinear multiple objective optimization (MOO) problems. The set of all feasible solutions u form the feasible region FR, which is defined as follows:

$$FR = \{u \in R^n : H(u,x)=0, G(u,x) \le 0,\} \quad (3)$$

Typically, each user has his/her wish list for the desired range of each objective function. We can incorporate the wish list of a user directly into the MOO formulations (1). To take the user wish list into account, we model the user's preferred objective values as constraints and propose the following user preference-based MOO problem formulation ((4a)-(4d) will be collectively referred to as (4)):

$$\text{minimize } F(u,x) = [f_1(u,x), \ldots, f_l(u,x)] \quad (4a)$$

$$\text{s.t. } h_i(u,x) = 0\, i \in I = \{1, \ldots, I\} \quad (4b)$$

$$g_j(u,x) \le 0\, j \in J = \{1, \ldots, J\} \quad (4c)$$

$$f_k(u,x) \le wl_k\, k \in K = \{1, \ldots, l\} \quad (4d)$$

In this formulation, the user wish list is represented by inequality constraints (4d) with a desired upper bound $wl_k$ for the kth objective function $f_k$. The user-defined wish list is hence represented by a l×1 vector, $WL = [wl_1, \ldots, wl_l]^T$. The feasible region of this user preference-based MOO formulation, termed the WL-feasible region, is defined as $$FR^{wl} = \{u \in \mathbb{R}^n : H(u,x)=0, G(u,x) \le 0, F(u,x) \le WL\} \quad (5)$$

The inequalities in (5) can be transformed into equalities by adding the slack variable vector b, with l components and the slack variable vector s with j components. Then formulation (5) becomes a nonlinear optimization problem with equality constraints:

$$\text{minimize } F(u, x) = [f_1(u, x), \ldots, f_l(u, x)] \quad (6)$$

$$\text{s.t. } H(u, x, b, s) = \begin{bmatrix} H(u, x) \\ G(u, x) + s^2 \\ F(u, x) - WL + b^2 \end{bmatrix} = 0$$

or equivalently, $$\text{minimize } F(U, X)$$

$$\text{s.t. } \tilde{H}(U, X) = 0 \quad (7)$$

where $U \in \mathbb{R}^{n+J+l}$, $X \in \mathbb{R}^m$, the augmented equality constraints are $\tilde{H}(U, X) = [h_1(U,X), \ldots, h_r(U, X)]^T$ with $r = I+J+l$, $U = (u, s, b)^T = (u_1, \ldots, u_n, s_1, \ldots, s_J, b_1, \ldots, b_l)^T$, and $X = (x_1 \ldots, x_m)^T$.

This disclosure provides a complete characterization of the feasible region of the MOO problem (1) and the WL-feasible region $FR^{wl}$ of the MOO problem (4). This disclosure explores the relationship between the WL-feasible region of the MOO problem (4) and the stable equilibrium manifolds of a class of non-hyperbolic dynamical systems that are defined by the augmented equality constraints (6).

Characterization of the Feasible Region. This disclosure provides a complete characterization of the feasible region (denoted by FR) of general MOO problem (1) and of the WL-feasible region (denoted by $FR^{wl}$) of user preference-based MOO problem (4). These two characterizations will play a key role in the disclosed method in solving both the user preference-based MOO problem (4) and the conventional constrained MOO problem (1).

Mathematical Preliminaries. An overview of the relevant concepts of nonlinear dynamical systems is presented below. We consider the following (autonomous) nonlinear dynamical system:

$$\dot{y}(t) = Q(y)\, y \in \mathbb{R}^n \quad (8)$$

It is natural to assume that the function (i.e., the vector field) Q: $\mathbb{R}^n \to \mathbb{R}^n$ satisfies a sufficient condition for the existence and uniqueness of a solution. The solution curve of Equation (8), starting from $y_0$ at t=0, is called the system trajectory, denoted by $\phi(t, y_0): \mathbb{R} \to \mathbb{R}^n$. A state vector, $y^* \in \mathbb{R}^n$ is called an equilibrium point of (8) if $Q(y^*)=0$; that is, an equilibrium point is a state vector that does not change in time.

Definition 1 (Stable Equilibrium Manifold)

A connected component, say $\Sigma$, is called an equilibrium manifold (EM) of system (8) if $Q(\Sigma)=0$. An equilibrium manifold $\Sigma$ is called stable if, for each $\varepsilon > 0$, there is $\delta = \delta(\varepsilon) > 0$ such that $$y \in B_\delta(\Sigma) \Rightarrow \phi(t,y) \in B_\varepsilon(\Sigma)\, \forall t \in \mathbb{R}$$

and is called asymptotically stable if it is stable and can be chosen such that $$y \in B_\delta(\Sigma) \Rightarrow \lim_{t \to \infty} \phi(t, y) \in \Sigma$$

where $B_\delta(\Sigma) = \{y \in \mathbb{R}^n : \|y-z\| < \delta, \forall z \in \Sigma\}$; otherwise, the equilibrium manifold is called unstable.

Definition 2 (Pseudo-Hyperbolic)

An isolated equilibrium manifold $\Sigma$ of (8) is called pseudo-hyperbolic if, for each $y \in \Sigma$, the Jacobian of $f(\bullet)$ at y, denoted by $J_{QH}(y)$, has no eigenvalues with a zero real part on the normal space $N_y(\Sigma)$ (the orthogonal complement of the tangent space $T_y(\Sigma)$) of $\Sigma$ at y in $\mathbb{R}^n$.

Characterization of the Feasible Region. To derive a complete characterization of the WL-feasible region, this disclosure designs a class of nonlinear dynamical systems to characterize the feasible region of (4). The central idea is that each connected feasible component of (4) corresponds to an attractor (more exactly, an asymptotically stable equilibrium manifold) of the nonlinear dynamical system. In this way, the task of locating a feasible component of the user preference-based MOO problem (4) can be accomplished via locating a stable equilibrium manifold of the system. One way to achieve this goal is to build a nonlinear non-hyperbolic dynamical system that satisfies the following requirement.

Non-Hyperbolic Dynamical System (HDS) Requirement: a set is a (regular) stable equilibrium manifold of the nonlinear non-hyperbolic dynamical system if and only if the set is a feasible component of the feasible region.

One nonlinear non-hyperbolic dynamical system satisfying the above requirement is the quotient gradient system (QGS) based on the augmented constraint set $\tilde{H}$ in formulation (7). This quotient gradient system is defined as follows:

$$\dot{y}(t)=Q_H(y):=-D\tilde{H}(y)^T \tilde{H}(y) \quad (9)$$

where $\tilde{H}:\mathbb{R}^{n+J+1} \to \mathbb{R}^{I+J+1}$ is assumed to be continuously differentiable. $D\tilde{H}:\mathbb{R}^{n+J+1} \to \mathbb{R}^{I+J+1} \times \mathbb{R}^{n+J+1}$ represents the Jacobian matrix of $\tilde{H}$ at y. Since the number of constraints in $\tilde{H}$ is usually different from the number of combined control variables and state variables, the quotient gradient system (9) is usually non-hyperbolic with its steady states being equilibrium manifolds instead of equilibrium points. Generically, all the equilibrium manifolds $\Sigma$ of the corresponding quotient gradient system are pseudo-hyperbolic and finite in number. Hence, the generic assumption, which is almost always satisfied, is made.

A1: $DH(y^*) \cdot DH(y^*)^T$ is nonsingular for any point $y^*$ on a stable equilibrium manifold $\Sigma$, i.e., $y^* \in \Sigma$.

It is shown herein that the WL-feasible region of (4) is completely characterized by the steady state of a constructed quotient gradient system (QGS).

Theorem 1: (Characterization of the WL Feasible Region).

If the user preference-based multi-objective optimization problem (4) has a corresponding quotient gradient system (9) that satisfies assumption A1, then the WL-feasible region, $FR^{wl}$, of optimization problem (4) equals the union of the stable equilibrium manifolds of quotient gradient system (9), i.e., $FR^{wl}=\cup \Sigma_i^s$, i=1, . . . , n, where $\Sigma_i^s$ is the ith stable equilibrium manifold of (9).

To illustrate Theorem 1, we consider the following problem (Example 1):

$$\text{minimize } f_1(x)=2+(x_1-2)^2+(x_2-1)^2 \quad 10(a)$$

$$\text{minimize } f_2(x)=9x_1-(x_2-1)^2 \quad 10(b)$$

$$\text{s.t. } c_1(x)=x_1^2+x_2^2 \leq 225 \quad 10(c)$$

$$c_2(x)=x_1-3x_2+10 \leq 0, \quad 10(d)$$

$$-20 \leq x_1 \leq 20, -20 \leq x_2 \leq 20. \quad 10(e)$$

Let a user wish list be $f_1(x) \leq 200, f_2(x) \leq 135$. The derived equality constraint set is formulated as follows:

$$\tilde{H} = \begin{bmatrix} x_1^2 + x_2^2 - 225 + s_1^2 \\ x_1 - 3x_2 + 10 + s_2^2 \\ 2 + (x_1-2)^2 + (x_2-1)^2 - 200 + s_3^2 \\ 9x_1 - (x_2-1)^2 - 135 + s_4^2 \end{bmatrix} = 0. \quad (11)$$

A corresponding quotient gradient system is defined as:

$$\dot{x}=Q_H(x)=-D\tilde{H}^T(x) \cdot H(x). \quad (12)$$

Figure 2A:
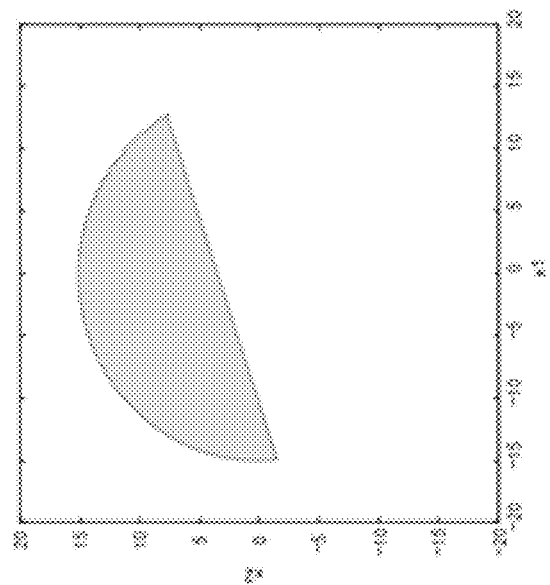
FIG. 2A and FIG. 2B show the stable equilibrium manifold of a quotient gradient system and the user-defined feasible region of the MOO problem, respectively.
Figure 2B:
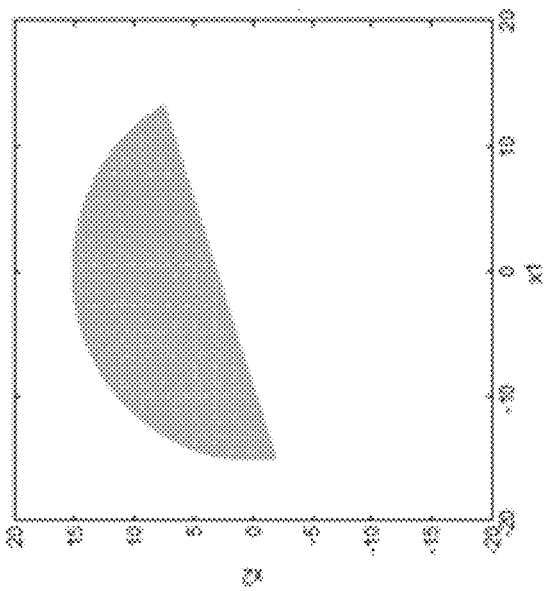

We numerically compute the WL-feasible region by computing the (regular) stable equilibrium manifolds of (12), shown as the shaded area in FIG. 2(b). There is only one stable equilibrium manifold, shown as the shaded area in FIG. 2(a). It is clearly observed that the WL-feasible region of the MOO problem (10), combined with the wish list, is completely characterized by the stable equilibrium manifold of the associate quotient gradient system (12), as asserted by Theorem 1.

Figure 3:
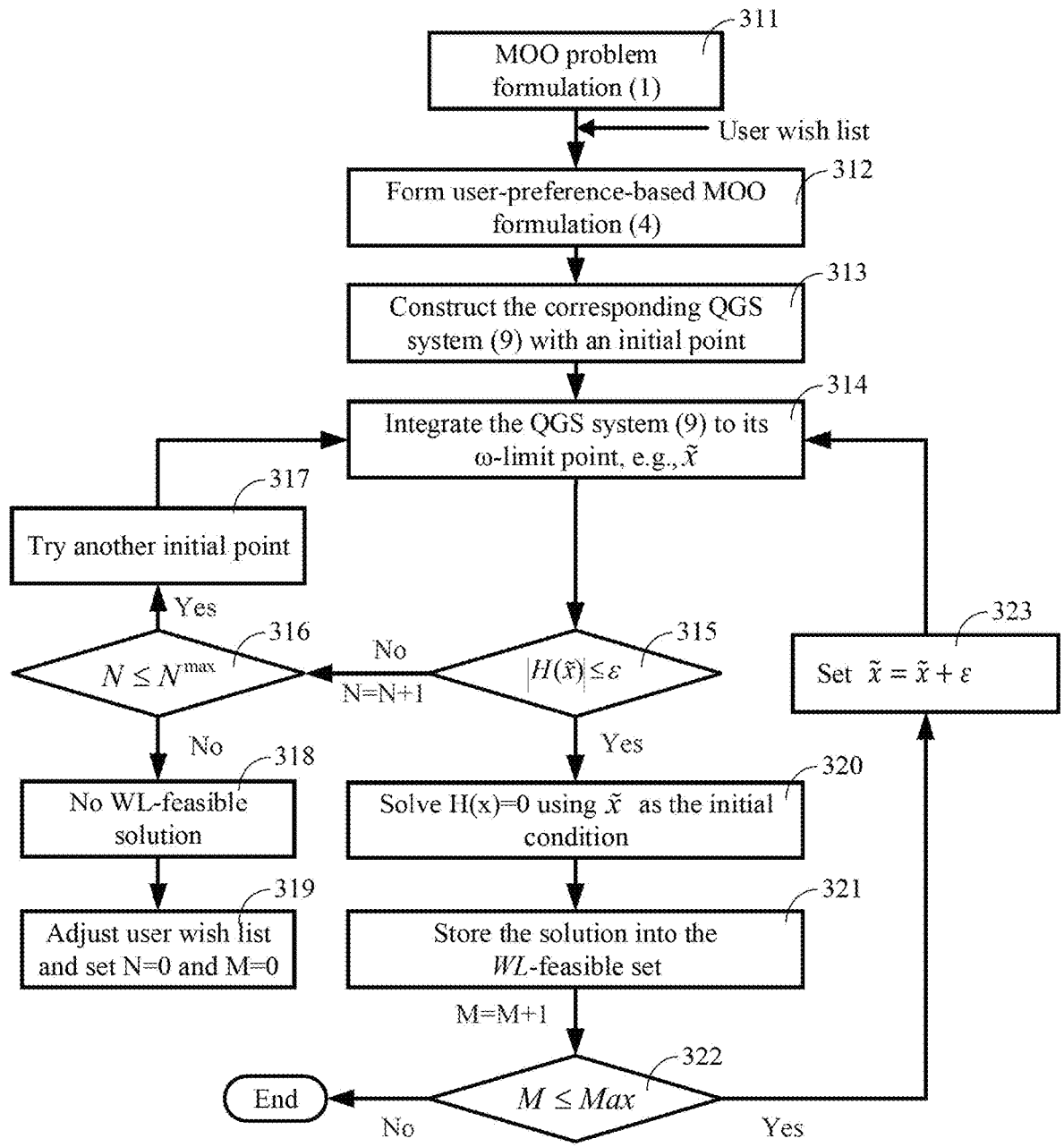
FIG. 3 is a flowchart of a user preference enabling (UPE) method according to one embodiment.

The User-preference-Enabling (UPE) MOO Method. The user preference enabling method for solving general constrained MOO problem (1) is described herein. One distinguishing feature of the method is that it solves the MOO problem to meet the satisfaction of users' wish lists and has a solid theoretical foundation. FIG. 3 is a flowchart illustrating the user preference enabling method according to one embodiment. The user preference enabling method includes the following steps.

Step 1: Given a MOO problem (1) (block 311), input a user wish list to form a user preference-based MOO problem formulation (4) (block 312).

Step 2: Construct the corresponding quotient gradient system (9) (block 313). Set N=0, M=0, where M is the number of WL-feasible solutions, and N is the number of initial solutions.

Step 3: Integrate system (9), starting from an initial point, to obtain the ensuing system trajectory and check whether it converges to its ω-limit point (block 314). If yes, go to Step 4; otherwise, try another initial point and repeat Step 3.

Step 4: Check the value of H($\tilde{x}$) where x is the ω-limit point of $\phi(t, x_0)$, and go to step 6 if $|H(\tilde{x})| \leq \varepsilon$ (block 315) where E is a small value; otherwise, proceed to the next step.

Step 5: Set N=N+1. If N≤$N^{max}$ (block 316), then go to Step 3 with another initial point $x_0$ (block 317); otherwise, there is no solution (block 318) and the wish list needs to be adjusted by the user. Output the obtained infeasible solution $x_p=\tilde{x}$ and stop (block 319).

Step 6: Solve the nonlinear algebraic equation H(x)=0 (for instance, by applying Newton's method) using the initial point $\tilde{x}$ (block 320). Let the solution be $x_{sol}$, and store $x_{sol}$ in the set of WL-feasible solutions (block 321) and proceed to the next step.

Step 7: Set M=M+1. If M≤Max (block 322), then go to Step 3 for another WL-feasible solution (block 323); otherwise, users can select a preferred solution $x_p$ from the set of WL-feasible points and output the set of WL-feasible solutions.

As a numerical illustration, we consider the following example with a user wish list being WL=[210, ∞]$^T$.

$$\text{minimize } f_1(x)=2+(x_1-2)^2+(x_2-1)^2$$

$$\text{minimize } f_2(x)=9x_1-(x_2-1)^2$$

$$\text{s.t. } c_1(x)=x_1^2+x_2^2=225,$$

$$-20 \leq x_1 \leq 20,$$

$$-20 \leq x_2 \leq 20. \quad (13)$$

WL=[210, ∞]$^T$ means that we impose an upper bound of 210 upon the first objective with no specific preference for the second one, i.e., $f_1(x) \leq 210$. Hence, the augmented equality constraint set is as follows:

$$\tilde{H} = \begin{bmatrix} 2+(x_1-2)^2+(x_2-1)^2-210+x_3^2 \\ x_1^2+x_2^2-225 \end{bmatrix}=0. \quad (14)$$

We note that $\tilde{H}(x)$ is a proper map. Hence, the ω-limit set of every trajectory exists. A three-dimensional QGS system is constructed for the user preference-based MOO problem:

$$Q_H*(x) = -DH^T(x) \cdot H(x) = \begin{bmatrix} -(2x_1-4)((x_1-2)^2+(x_3-1)^2+x_3^2-208)-2x_1(x_1^2+x_2^2-225) \\ -(2x_2-2)((x_1-2)^2+(x_2-1)^2+x_3^2-208)-2x_2(x_1^2-x_2^2-225) \\ -2x_3((x_1-2)^2+(x_3-1)^2+x_3^2-208) \end{bmatrix} \quad (15)$$

Figure 4:
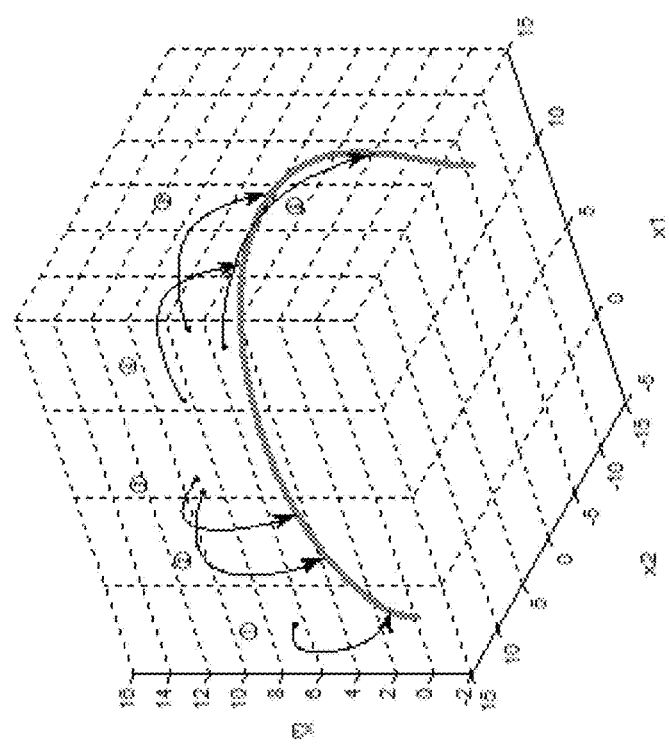
FIG. 4 illustrates dynamical system trajectories in a three-dimensional search space that are bounded and converge to one feasible solution lying in a stable equilibrium manifold (SEM).

FIG. 4 shows several trajectories of the QGS system in three-dimensional space. We notice that every bounded trajectory starting from an infeasible solution converges to a WL-feasible solution. The grey curve is the one-dimensional stable equilibrium manifold of system (15). Detailed numerical results of multiple WL-feasible solutions are described in Table 1.

FAST COMPUTATION OF FEASIBLE SOLUTIONS. The MOO problems may be solved by using a class of non-hyperbolic dynamical systems that satisfy the HDS requirement. One such dynamical system is the quotient gradient system. To achieve fast computation in the user preference enabling method, any algorithm that can quickly calculate the $\omega$-limit set of the corresponding dynamical systems is applicable. We take a trajectory-unified method as an example in this disclosure.

The disclosed method was developed for the feasible solution search (FS) problem and for the preferred solution search (PSS) problem. The feasible solutions search (FS) problem calculates a feasible solution satisfying: $FR=\{u\in \mathbb{R}^n: H(u,x)=0, G(u,x)\leq 0\}$.

The method for the FS problem is composed of the following steps:

Step 1: Transform the original constraint set into the equality set $\hat{H}$.

$\hat{H}=\{y=(u,s)\in R^{n+J}:H(u,x)=0,G(u,x)+s^2=0\}$

Step 2: Design a nonlinear dynamical system satisfying the HDS requirement based on the constraint set constructed at Step 1. For instance, the following QGS satisfies the HDS requirement:

$x_{sol}$, output $x_{sol}$ as a feasible point; otherwise, repeat Step 3 with another initial point.

In Step 3, a fast method to compute the corresponding limit point is applicable. In Step 4, a robust and fast method for solving nonlinear algebraic equations such as the Newton method is applicable.

To illustrate the computation process, we consider the following test problem:

$$\text{minimize } f_1(x)=2+(x_1-2)^2+(x_2-1)^2 \quad (17a)$$

$$\text{minimize } f_2(x)=9x_1-(x_2-1)^2 \quad (17b)$$

$$\text{Subject to } c_1(x)=x_1{}^2+x_2{}^2 \leq 225, \quad (17c)$$

$$c_2(x)=x_1\_3x_2+10\leq 0, \quad (17d)$$

$$20\leq x_1\leq 20, -20\leq x_2\leq 20. \quad (17e)$$

The derived equality constraint set is formulated as follows:

$$H_1 = \begin{bmatrix} x_1^2+x_2^2-225+s_1^2 \\ x_1-3x_2+10+s_2^2 \end{bmatrix} = 0 \quad (18)$$

Then the associated quotient gradient system is constructed by $$\dot{x}=DH_1(x)^T H_1(x) \quad (19)$$

TABLE I

DETAILED INFORMATION OF TRAJECTORIES IN THREE-DIMENSIONAL SEARCH SPACE

| Trajectory | | Convergence Information | | |
|---|---|---|---|---|
| No. | | Trajectory points | Feasibility check | f(·) |
| 1 | Starting point | [0.39, 4, 14.02] | [3.98e-13, -208.84] (infeasible) | (187.85 -149.04) < (210, ∞) |
|   | Ending point | [3.75, 14.52, 4.70] | [2.42e-010, -2.02e-010] (feasible) | (a user-oriented feasible solution) |
| 2 | Starting point | [3.6, 1.6, 14.32] | [-1.05e-12, -2.0948] (infeasible) | (164.91, 96.30) < (210, ∞) |
|   | Ending point | [13.67, 6.17, 6.71] | [5.83e-13, 3.13e-13] (feasible) | (a user-oriented feasible solution) |
| 3 | Starting point | [6.80, 0, 13.56] | [5.97e-13, -178.76] (infeasible) | (170.51, 134.79) < (210, ∞) |
|   | Ending point | [14.98, 0.82, 6.29] | [-5.97e-13, -6.25e-13] (feasible) | (a user-oriented feasible solution) |
| 4 | Starting point | [4, -3.60, 13.52] | [1.137e-13, -196.04] (infeasible) | (195.85, 40.14) < (210, ∞) |
|   | Ending point | [12.87, -7.70, 3.75] | [-7.99e-13, -1.02e-12] (feasible) | (a user-oriented feasible solution) |
| 5 | Starting point | [-4.40, 10.80, 8.43] | [7.11e-14, -89] (infeasible) | (208.37, -207.72) < (210, ∞) |
|   | Ending point | [-1.55, 14.92, 1.28] | [1.35e-12, 1.45e-12] (feasible) | (a user-oriented feasible solution) |
| 6 | Starting point | [-0.39, 4, 13.90] | [-4.26e-13, -208.84] (infeasible) | (19.99, -180) < (210, ∞) |
|   | Ending point | [1.53, 14.92, 3.74] | [-7.34e-10, 7.22e-10] (feasible) | (a user-oriented feasible solution) |

$$\dot{y}(t)=Q_{\hat{H}}(y):=-D\hat{H}(y)^T\hat{H}(y) \quad (16)$$

where $\hat{H}: \mathbb{R}^{n+J} \to \mathbb{R}^{I+J}$ is assumed to be smooth. $D\hat{H}: \mathbb{R}_{n+J} \to \mathbb{R}^{I+J} \times \mathbb{R}^{n+J}$ represents the Jacobian matrix of $\hat{H}$ at y.

Step 3: Given an initial point $(u_0, x_0)$, quickly compute the corresponding $\omega$-limit point, say $\tilde{x}$.

Figure 5:
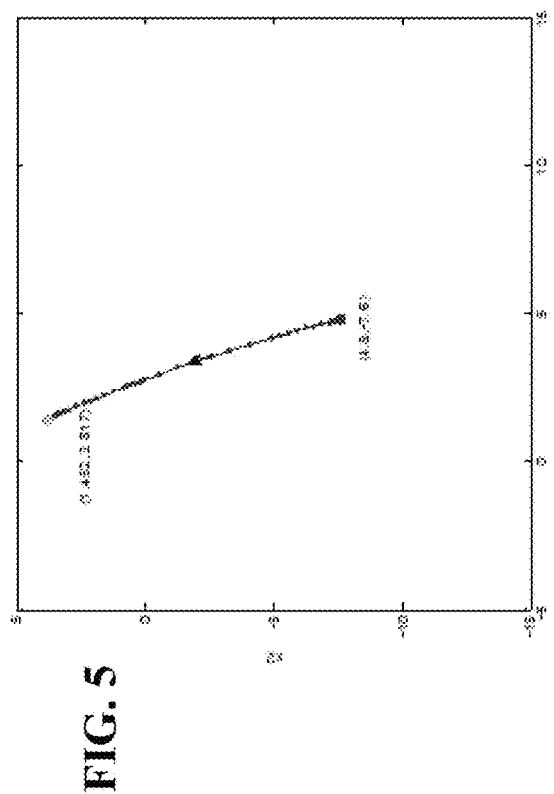
FIG. 5 illustrates a computation process in solving a feasible solution search (FS) problem according to one embodiment.

Step 4: Check the value of $\hat{H}(\tilde{x})$. If $|\hat{H}(\tilde{x})| \leq \varepsilon$, where $\varepsilon$ is a tolerance value, solve the set of nonlinear algebraic equations $\hat{H}(x)=0$ with the initial point $\tilde{x}$. Let the solution be FIG. 5 illustrates the trajectory of the proposed method from the given initial point $x_0=[4.8, -7.6]^T$ to a feasible solution $x_1=[1.452, 3.817]^T$. It is observed that the proposed method can deterministically detect a feasible solution (green point) for the MOO problem.

FAST COMPUTATION OF PREFERRED FEASIBLE SOLUTIONS. The preferred feasible solutions search problem is to calculate a WL-feasible solution satisfying both the constraint set and the user wish list, starting from an arbitrary (infeasible) initial point. This disclosure proposes to solve the PSS problem by iteratively improving feasible solutions of the FS problem until it meets the user's goals. The disclosed method for the PSS problem is composed of the following steps:

Step 1: Incorporate the user's wish list into the constraints.

$$FR=\{u\in \mathbb{R}^n: G(u,x)\leq 0, H(u,x)=0, F(u,x)\leq WL,\} \quad (20)$$

Step 2: Build the augmented equality constraint set, $$\tilde{H}(u, x, b, s) = \begin{bmatrix} H(u, x) \\ G(u, x) + s^2 \\ F(u, x) + b^2 \end{bmatrix} = 0 \quad (21)$$

Step 3: Design a nonlinear dynamical system satisfying the HDS requirement based on augmented equality constraint set constructed at Step 2. For instance, the following QGS satisfies the HDS requirement:

$$\dot{y}(t)=Q_H(y):=-D\tilde{H}(y)^T\tilde{H}(y). \quad (22)$$

Step 4: Given an initial point, quickly compute the corresponding ω-limit point, e.g., $\tilde{y}$.

Step 5: Check the value of $H(\tilde{y})$. If $|H(\tilde{y})|\leq \varepsilon$ where $\varepsilon$ is a tolerance value, then solve the set of nonlinear algebraic equations $H(y)=0$ with the initial point $\tilde{y}$. Let the solution be $y_{sol}$ and output $y_{sol}$ as a WL-feasible point; otherwise, go to Step 4 with a new initial point.

Figure 6:
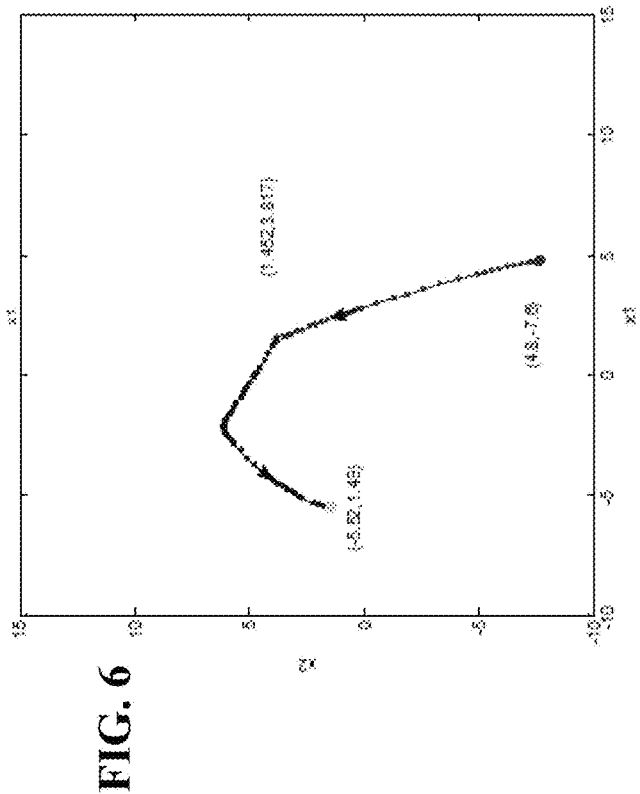
FIG. 6 illustrates a computation process in solving a preferred solution search (PSS) problem according to one embodiment.

FIG. 6 illustrates a computation process in solving a preferred solution search (PSS) problem from the given initial point $x_0=[4.8, -7.6]^T$.

COMPUTING TARGETED PARETO-OPTIMAL SOLUTIONS. This disclosure also presents an iterative user preference enabling method to compute targeted Pareto-optimal solutions of general MOO problem (1). This iterative method takes advantage of the user-preference-enabling method developed in the previous section.

Step 1: Given a constrained multi-objective optimization problem (1), formulate the corresponding user-defined MOO problem (4) according to user wish list $WL_0$. Set i=0, j=1, and choose a set of initial points. For each initial point $x_0$, do the following:

Step 2: Apply the user preference enabling method to compute a feasible solution of (4) with $x_0$. If a solution is found, say $x_p$, then proceed to step 3; otherwise, go to Step 4.

Step 3: Scale down the user wish list $WL_i$ to $WL_{i+1}$ by multiplying $\alpha_i$ i.e., $WL_{i+1}=\alpha_i \cdot WL_i$, where $\alpha_i<1$. Set $x_0=x_p$, i=i+1, and go to step 2 with the updated wish list.

Step 4: Scale up the wish list to $WL_{0+j}$ by multiplying $\beta_j$, i.e., $WL_{i+j}=\beta_j \cdot WL_i$, where $\beta_j>1$ and $\beta_j \cdot \alpha_i<1$. Set $x_0=x_p$, j=j+1, and apply the user preference enabling method to find a feasible solution satisfying the updated wish list $WL_{i+j}$. If a user preference feasible solution $x_p$ is found, proceed to the next step; otherwise, increase $\beta_j$ with $\beta_j \cdot \alpha_i<1$ and repeat Step 4.

Step 5: Check $\beta_j \leq \varepsilon$ where $\varepsilon$ is a small positive value. If it holds, output $x_p$, as a Pareto-optimal solution and stop; otherwise, set $\gamma=0.5*(1+\beta_j)$ and apply the user preference enabling method to calculate a feasible solution with $WL_\gamma=WL_i*\gamma$. If a feasible solution $x_p$ exists, update $\beta_j=\gamma$, $WL_{i+j}=WL_\gamma$ and repeat Step 5; otherwise, update $\alpha_i=\gamma$, $WL_i=WL_\gamma$ and go to Step 4.

This method is designed to find user preference-based feasible solutions and drive them toward the target Pareto solution set.

We illustrate the proposed targeted Pareto optimal solution method on an example. The original problem formulation and user wish list are expressed as follows:

Original MOO Problem Formulation:

$$f_1(x)=x_1$$

min $$f_2(x)=x_2$$

s.t. $g_1(x)=1-x_1^2-x_2^2+0.1 \cos(16 \arctan x_1/x_2)\leq 0$ $g_2(x)=(x_1-0.5)^2+(x_2-0.5)^2-0.5\leq 0$ $$0\leq x_1, x_2 \leq \pi \quad (23)$$

Formulation (23) is the original MOO problem formulation. The user wish list and the corresponding user-defined formulation are presented as follows. The initial user wish list is $$WL_0 = [0.95, 0.95]^T \Rightarrow \begin{bmatrix} f_1(x) \leq 0.95 \\ f_2(x) \leq 0.95 \end{bmatrix}.$$

Hence, it becomes $$f_1(x)=x_1$$

min $$f_2(x)=x_2$$

s.t. $f_1(x)\leq 0.95$ $f_2(x)\leq 0.95$ $g_1(x)=1-x_1^2-x_2^2+0.1 \cos(16 \arctan x_1/x_2)\leq 0$ $g_2(x)=(x_1-0.5)^2+(x_2-0.5)^2-0.5\leq 0$ $$0\leq x_1, x_2 \leq \pi \quad (24)$$

Then the augmented constraint set H(x) associated with the user-defined MOO problem is:

$$H(x) = \begin{bmatrix} f_1 - 0.95 + x_3^2 \\ f_2 - 0.95 + x_4^2 \\ 1 - x_1^2 - x_2^2 + 0.1\cos(16\arctan x_1/x_2) + x_5^2 \\ 1 - x_1^2 - x_2^2 + 0.1\cos(16\arctan x_1/x_2) + x_6^2 \end{bmatrix} = 0$$

A 6-dimensional quotient gradient system is thus constructed as follows:

$$Q_H(x)=\dot{x}=-DH^T(x)H(x). \quad (25)$$

Figure 7:
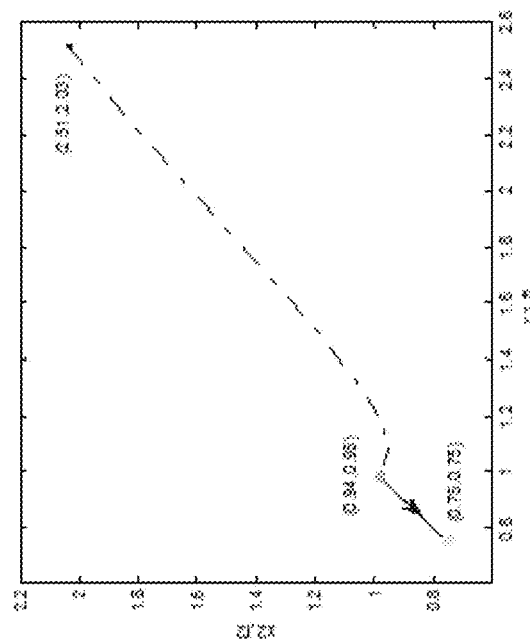
FIGS. 7, 8, 9 and 10 illustrate an iterative UPE method to compute targeted Pareto-optimal solutions according to one embodiment.
Figure 8:
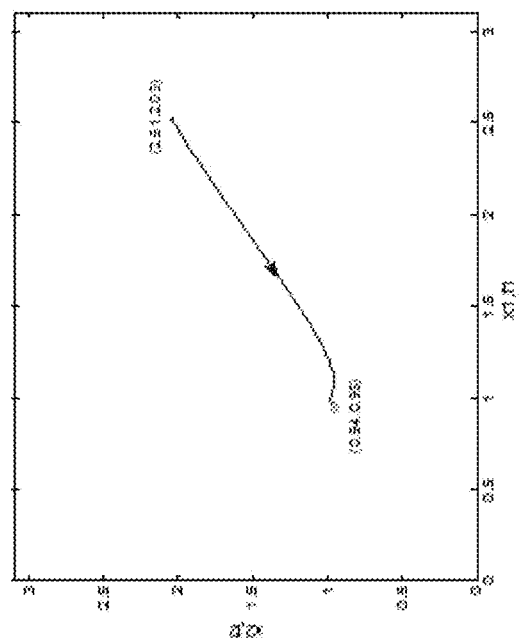

FIGS. 7, 8, 9 and 10 illustrate an iterative user-preference-based method to compute targeted Pareto-optimal solutions according to one embodiment. By applying Step 2 of the proposed method with the initial point $x_0$ (2.5089, 2.0345, 0, 0, 3.0730, 0, 1.5840, 1.4263), we obtain a feasible solution $x_1$ of problem (23). The process is shown in FIG. 7. In Step 3, we then "tighten" the wish list to $WL=[0.8, 0.8]^T$. Using the previous user-defined feasible solution $x_1$ of $WL_0=[0.95, 0.95]^T$ as an initial point, we apply Step 2 to compute a new user-defined feasible solution x, to satisfy the heightened target. The trajectory of this process is shown in FIG. 8. The solid curve is the trajectory from $x_1$ to a new feasible solution $x_2$ with WL=$[0\ 0.8,\ 0.8]^T$.

Figure 9:
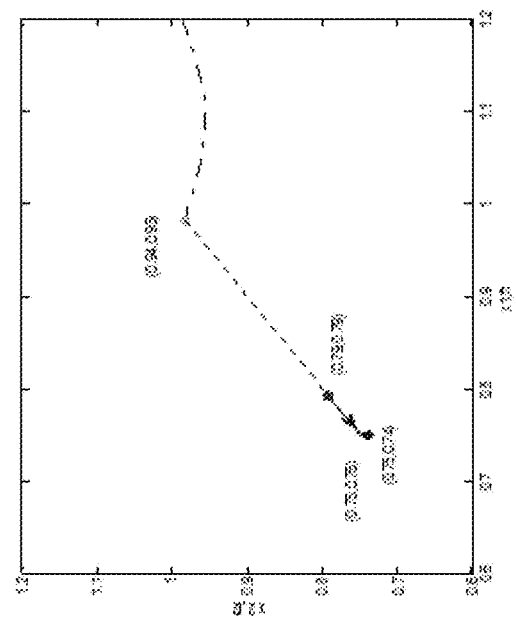

By continually scaling down the wish list, the proposed method computes improved feasible solutions that improve all the objectives simultaneously. In this problem, a user-defined feasible solution can be found until WL=$[0.6,\ 0.6]^T$. As shown in FIG. 9, the trajectory of the feasible region-based method converges to a degenerate SEM $n_3$, implying that there are no feasible solutions whose objectives satisfy WL=$[0.6,\ 0.6]^T$. According to Step 4 of the proposed method, the wish list is relaxed to obtain a WL-feasible solution.

Figure 10:
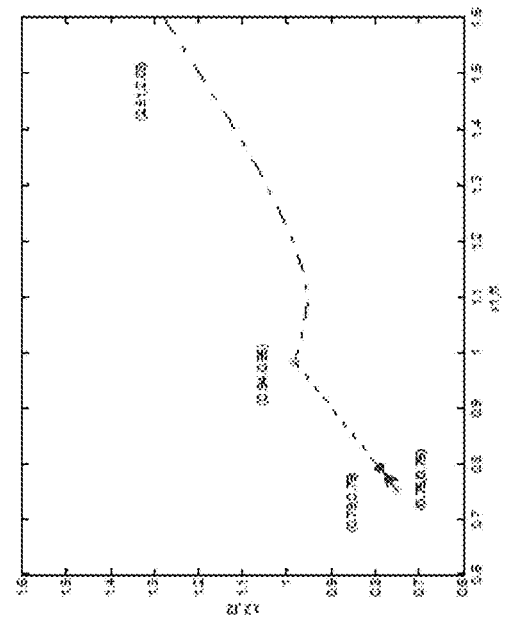

By relaxing the wish list to WL=$[0.75,\ 0.75]^T$, the method recovers a user-defined feasible solution (shown in FIG. 10). In the relaxation process, the user can continually adjust the wish list until a satisfactory solution is obtained. The user-defined feasible solutions obtained with different wish lists are summarized in Table II. The concept of generational distance (GD) was employed to calculate the distance between the user-defined feasible solution P computed by the feasible region-based method and the Pareto-optimal front P. GD is defined as follows:

$$GD = \frac{\sqrt{\Sigma_{x \in P} mindis(x,\ P^*)^2}}{|P^*|} \quad (26)$$

EVALUATION OF THE USER PREFERENCE-BASED FEASIBLE SOLUTIONS FOR WISH LISTS

| Sol No. | Solution of disclosed method | Distance to Pareto front | Generational Distance | Feasibility |
|---|---|---|---|---|
| x0 | [2.5089, 2.0345] | 1.4 | 250.14 | Yes |
| x1 | [0.9827, 0.9827] | 0.7823 | 96.36 | Yes |
| x2 | [0.7522, 0.7522] | 0.0136 | 1.74 | Yes |
| n3 | [0.7924, 0.7924] | — | — | No |
| x4 | [0.7498, 0.7398] | 0.0057 | 0.54 | Yes |

A Hybrid Method for User Preference-Based MOO Problem.

This disclosure also provides a powerful hybrid method that is a combination of the user preference enabling (UPE) method with existing methods, such as multi-objective evolutionary algorithms (MOEA) and the deterministic method, to effectively solve user preference-based MOO problems as well as conventional MOO problems. Next, the framework of several powerful hybrid methods for computing general Pareto optimal solutions and targeted Pareto optimal solutions are presented.

1) Framework for the Evolutionary MOO Method Guided UPE Method.

A framework is disclosed for the UPE method to co-operate with existing evolutionary methods to compute Pareto optimal solutions as well as the targeted Pareto optimal solution, which includes the following three stages: Stage I: Exploration stage; Stage II: Guiding stage; and Stage III: Refinement stage.

This disclosure next presents a general hybrid version of the UPE method and any population-based meta-heuristic method to compute targeted Pareto optimal solutions.

The Population-Based Meta-Heuristic MOO-Guided User Preference Enabling Method

Step 1: Exploration stage. Apply a population-based meta-heuristic MOO method with a population of candidate solutions to the underlying MOO problem until all of the populations reach a consensus when groups of populations are formed. For each group of sub-populations, select the representative particles in the group. Each particle is a candidate solution for the underlying MOO problem.

Step 2: Guiding stage. For each selected particle from each group, apply the user preference enabling method with the selected one being the initial vector to obtain the corresponding WL-feasible solution.

Step 3: Refinement stage. Apply a local MOO solver to each obtained WL-feasible solution to reach a targeted Pareto optimal solution.

Figure 11:
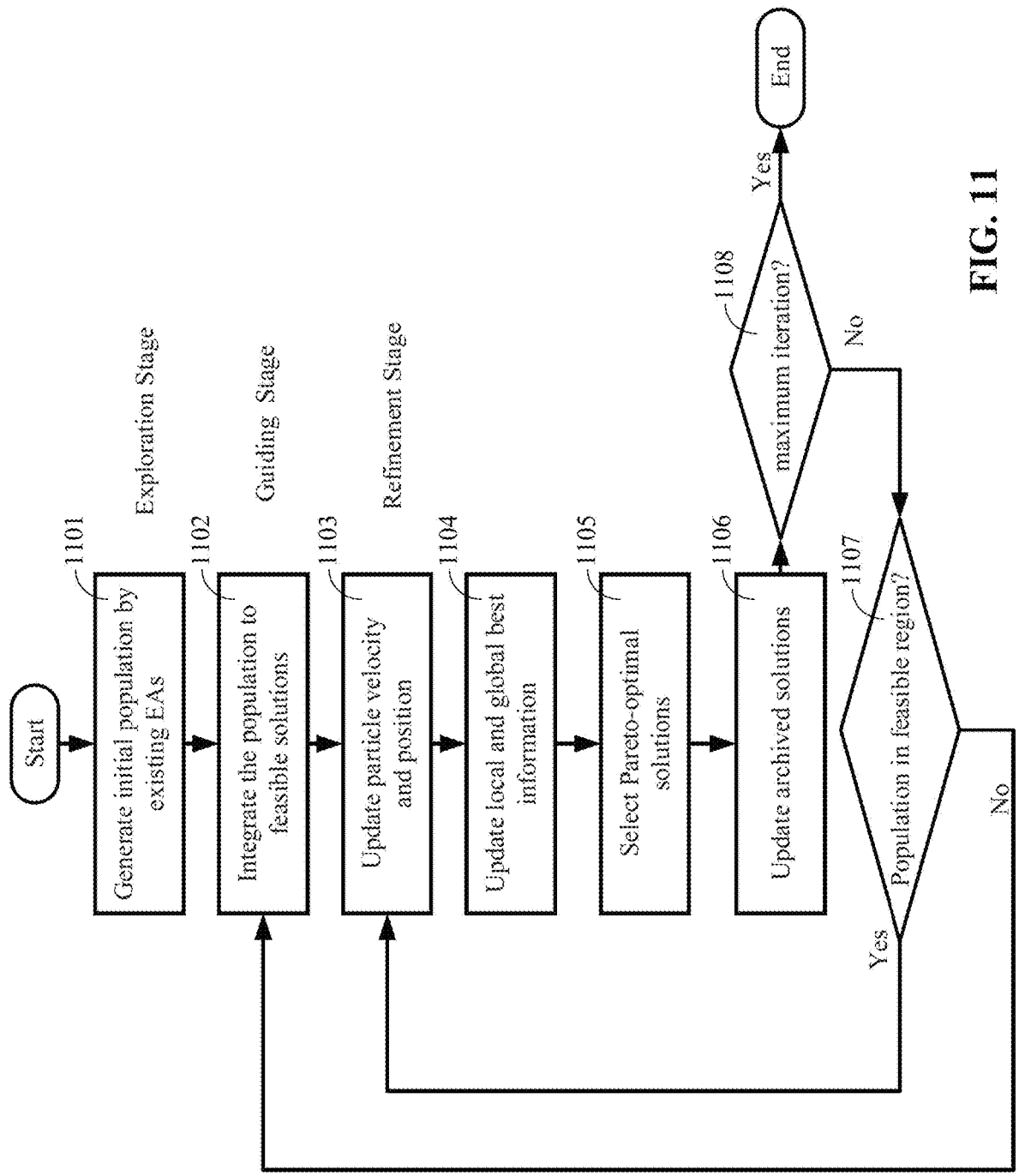
FIG. 11 is a flowchart illustrating a hybrid method of MOPSO-guided UPE method according to one embodiment.

For Step 1, different population-based meta-heuristic methods such as the multi-objective evolutionary algorithm or its variant, or the MOPSO method or its variant can be applied as illustrated in the following. FIG. 11 is a flow chart illustrating the framework of the MOPSO-guided UPE method according to one embodiment, for computing the targeted Pareto optimal solution.

The MOPSO-Guided User Preference Enabling Method

Step 1: Exploration stage. Apply the MOPSO method to the underlying MOO problem until all the populations reach a consensus when groups of populations are formed. For each group of populations, select the centered particles in the group (block 1101).

Step 2: Guiding stage. For each selected particle from each group, apply the user preference enabling method with the selected one being the initial vector to obtain the corresponding WL-feasible solution (block 1102).

Step 3: Refinement stage. Apply a local MOO solver to each obtained WL-feasible solution to reach a target Pareto optimal solution (blocks 1103-1108).

Figure 12:
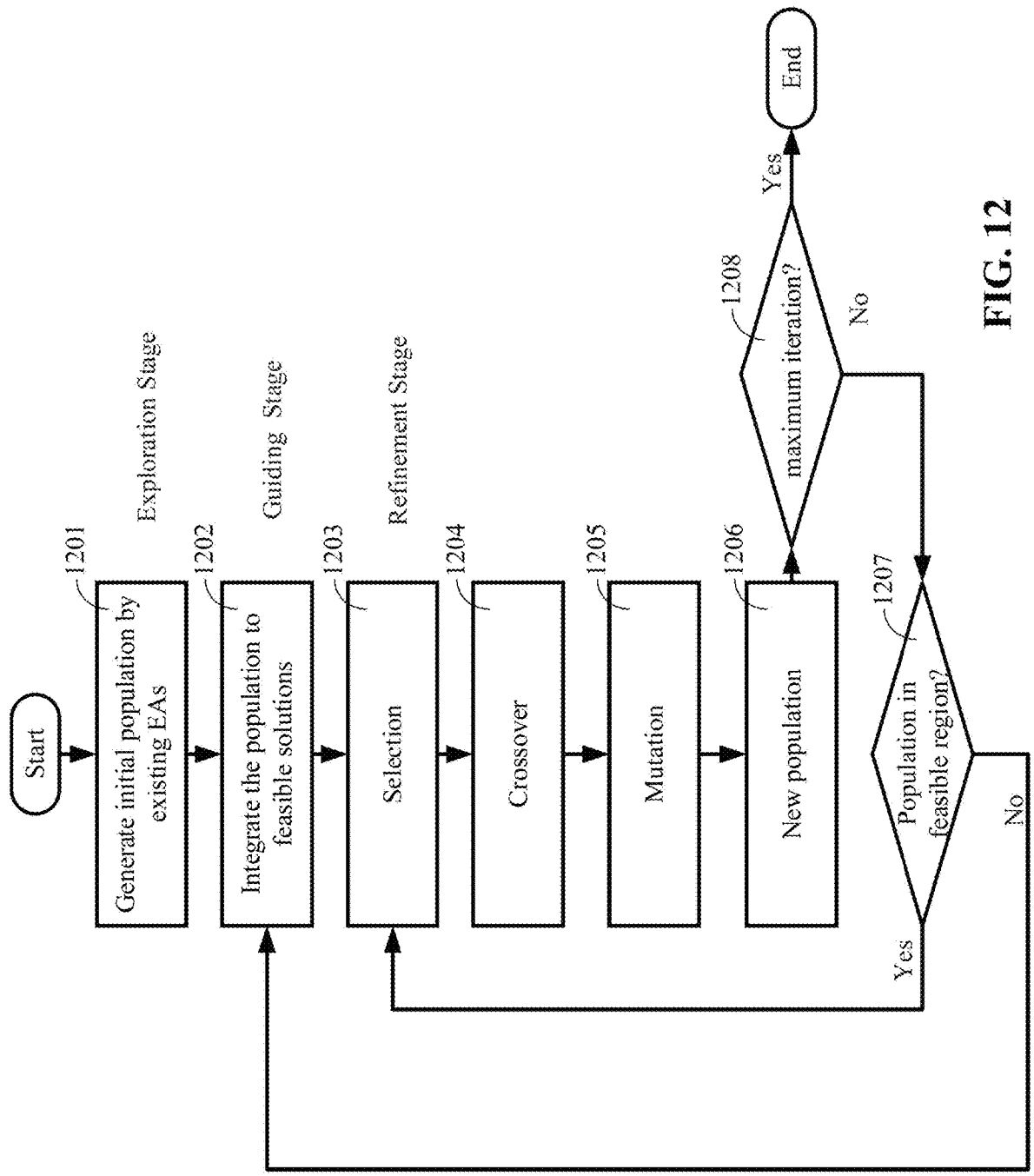
FIG. 12 is a flowchart illustrating a hybrid method of NSGA-II-guided UPE method according to one embodiment.

A framework for an evolutionary algorithm-guided user preference enabling method is developed to compute the Pareto optimal solution. The NSGA-II is utilized here to illustrate this hybrid method. FIG. 12 is a flow chart illustrating a hybrid method of NSGA-II-guided UPE method according to one embodiment, for computing the targeted Pareto optimal solution.

An NSGA-II-Guided User Preference Enabling Method

Step 1: Exploration stage. Apply the NSGA-II method to the underlying MOO problem until all the populations reach a consensus when groups of populations are formed. For each group of populations, select the centered particles in the group (block 1201).

Step 2: Guiding stage. For each selected particle from each group, apply the user preference enabling method with the selected one being the initial vector to obtain the corresponding WL-feasible solution (block 1202).

Step 3: Refinement stage. Apply a local MOO solver to each obtained WL-feasible solution of Step 2 to find a target Pareto optimal solution (blocks 1203-1208).

2) The User Preference Enabling Method Enhanced Deterministic MOO Method.

The UPE method can also assist the deterministic MOO method, such as the Normal Boundary Intersection (NBI) method and the Normal Constraint (NC) method for computing Pareto-optimal solutions. Compared with evolutionary algorithms, the deterministic method has better performance in fast calculations of nearby Pareto-optimal solutions. A modified NC method, referred to as the Normalized Normal Constraint (NNC) method, is utilized in this embodiment to illustrate our disclosed framework. Other effective local methods can also be applied.

The Normalized Normal Constraint Method.

Figure 13:
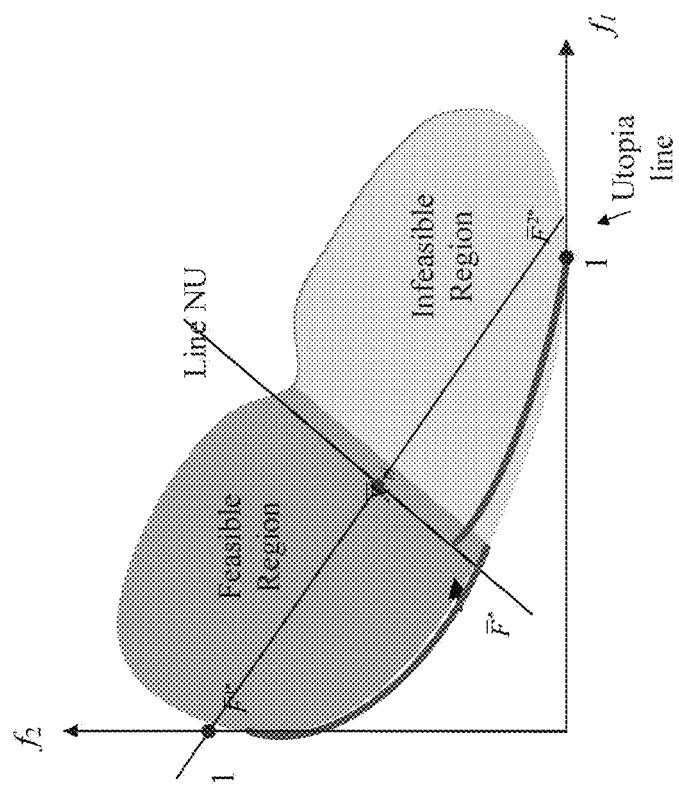
FIG. 13 is a graphical representation of a normalized normal constraint method for bi-objective problems.

Both the NNC method and the NBI method are able to generate uniformly spread Pareto points. The NNC method works similarly to the NBI method. In FIG. 13, the objective space for a general bi-objective optimization problem and the corresponding Pareto frontier are illustrated.

The utopia line (or plane) is the line joining the two anchor points (i.e., end points of the Pareto frontier). These anchor points are obtained when the generic ith objective is minimized independently. To obtain the Pareto points, the utopia line is divided into several points $\overline{X}_p$ (analogous to CHIM points in the NBI method). In an interactive process, from each point $\overline{X}_p$, a normal line (or plane) is used to reduce the feasible space. Minimizing $\overline{f}_2$ results in the Pareto point $\overline{F}^*$. Consequently, after translating the normal line for all $\overline{X}_p$ points, the whole set of Pareto solutions will be found. For more than two objectives, the projection of the utopia plane does not cover the entire Pareto front.

Figure 14:
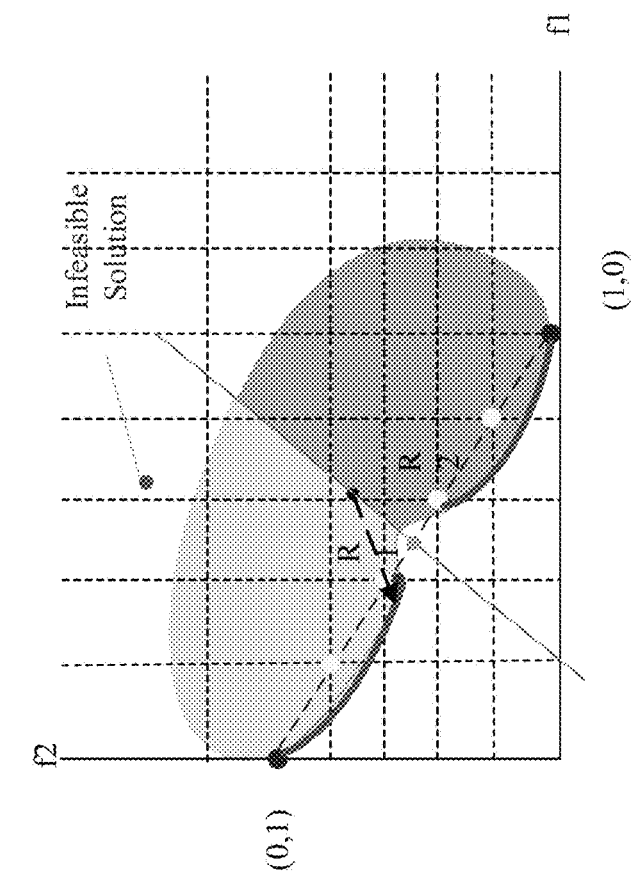
FIG. 14 is a graphical representation of a modified normalized normal constraint method for bi-objective problems.
Figure 15:
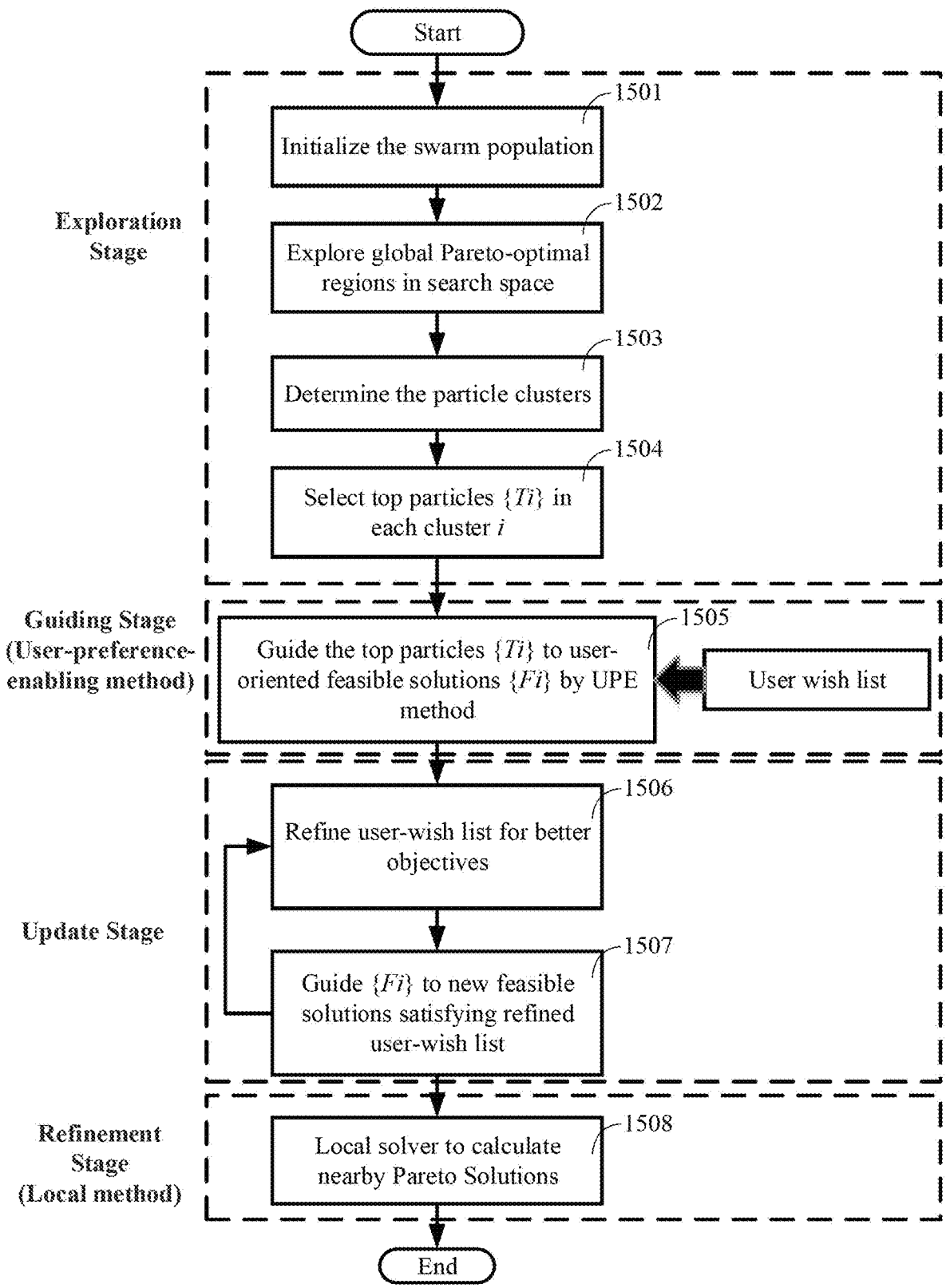
FIG. 15 is a flowchart illustrating a UPE enhanced deterministic method according to one embodiment.

In this disclosure, a modified NNC method is employed in the framework for computing the Pareto optimal solution. In this modified NNC method (FIG. 14), a normal line is calculated from an arbitrary feasible solution $s_p$, instead of the points on utopia line $\overline{X}_p$. In this framework, the user preference enabling method and a deterministic MOO method (e.g., the modified NNC method) are iteratively utilized to calculate new Pareto-optimal solution. An embodiment of this hybrid method is shown in the flow chart of FIG. 15.

The User Preference Enabling Method Enhanced Deterministic MOO Method.

Input: the MOO problem and the initial wish list.

Step 1: Exploration stage. Apply a population-based meta-heuristic method for a certain number of generations and stop when groups of population are formed (blocks 1501-1503). Select multiple particles from each group of populations according to a pre-specified rule (block 1504).

Step 2: Guiding stage. Apply the user preference enabling method to guide each selected particle in the population to a user preference-based feasible component (block 1505).

Step 3: Update stage: Apply the one or more objective values of the obtained feasible solutions to refine the user wish list (block 1506), and guide the feasible solutions to new solutions that satisfy the refined wish list (block 1507).

Step 4: Refinement stage. For each new (feasible) solution obtained in Step 3, apply a deterministic MOO method to compute a nearby targeted Pareto-optimal solution of the MOO problem (block 1508).

Figure 16:
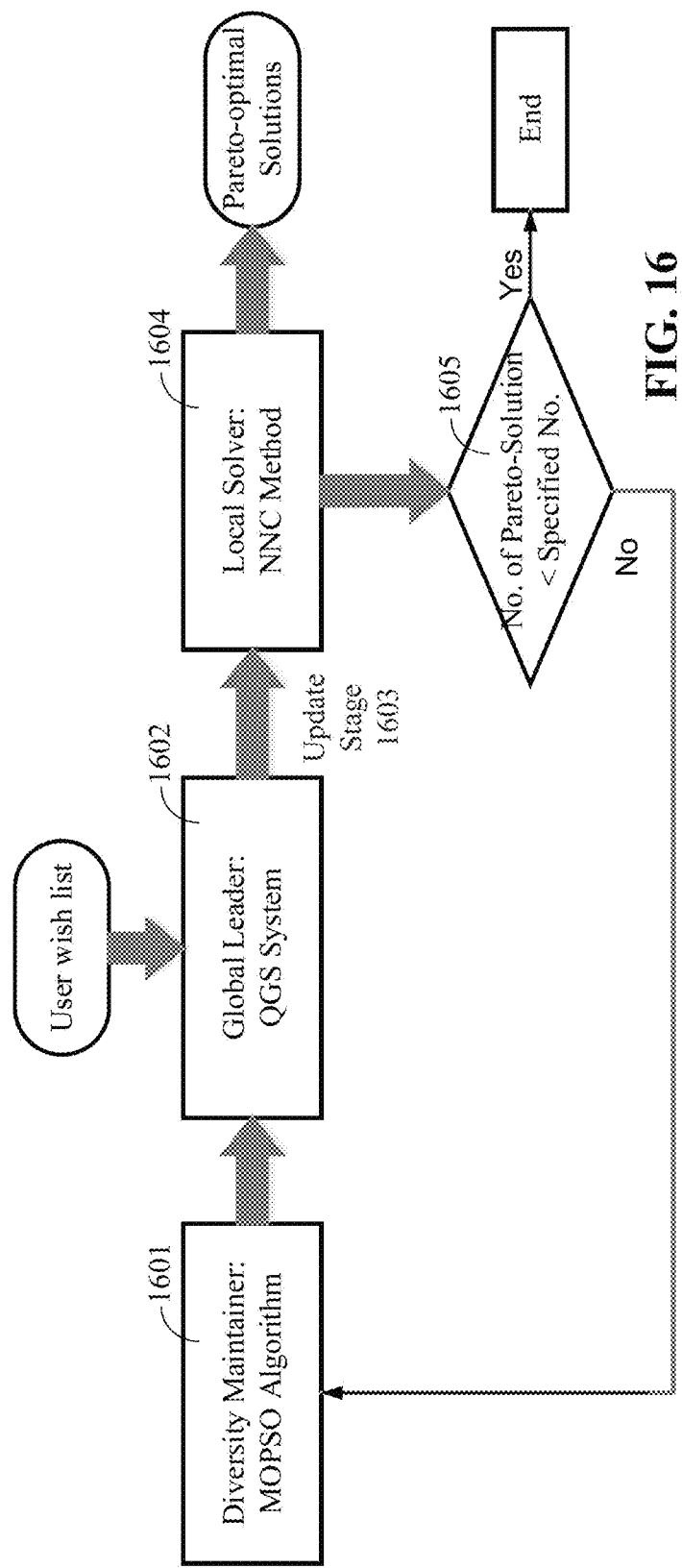
FIG. 16 is a flowchart of a hybrid method guided according to one embodiment.

An effective meta-heuristic MOO method can be used in Step 1 such as an evolutionary method; e.g., the PSO-based (Particle Swarm Optimization-based) method, while an effective deterministic MOO method can be used in Step 4 such as the NNC method. Hence, the above-disclosed methodology is quite general. When the MOPSO method is applied at Step 1 and a modified NNC method is used in Step 4, the above general methodology leads to the following method, an embodiment of which is illustrated in the flow chart of FIG. 16.

A user preference enabling method enhanced modified NNC method.

Input: the MOO problem and the initial wish list.

Step 1: Exploration stage. Apply the MOPSO method for a certain number of generations and stop when groups of populations are formed (block 1601). Select multiple particles from each group of populations according to a pre-specified rule.

Step 2: Guiding stage. Apply the user preference enabling method to guide each selected particle in the population to a user preference-based feasible component (block 1602).

Step 3: Update stage: Apply the one or more objective values of obtained feasible solutions to refine the user wish list, and guide the feasible solutions to new solutions that satisfy the refined wish list (block 1603).

Step 4: Refinement stage. For each new (feasible) solution obtained in Step 3, apply the modified NNC method to compute a nearby targeted Pareto-optimal solution of the MOO problem (block 1604). If the number of Pareto solutions is less than a specified number, return to step 1 (block 1605).

Hybrid Method for Conventional MOO Problem

Step 1: Exploration stage. Apply a population-based meta-heuristic MOO method to the underlying MOO problem until all of the populations reach a consensus when groups of populations are formed. For each group of sub-populations, select the representative particles in the group.

Step 2: Guiding stage. For each selected particle from each group, apply the dynamical method to compute a feasible solution with the selected one being the initial vector.

Step 3: Refinement stage. Apply a local MOO solver to each obtained feasible solution to reach a Pareto optimal solution.

For Step 1, different population-based meta-heuristic methods such as the multi-objective evolutionary algorithm or its variant, and the MOPSO method or its variant can be applied. For Step 3, both the NNC method and the NBI method can be applied.

Figure 18:
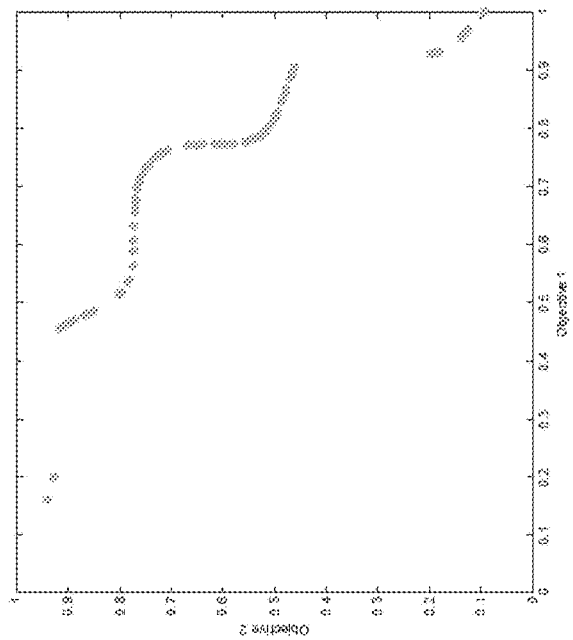
FIG. 18 is the Pareto-optimal front of a Tanaka (TNK) problem.
Figure 17:
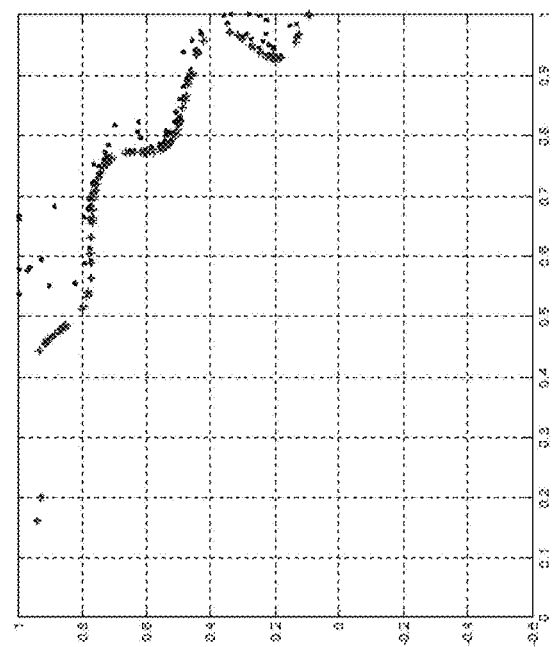
FIG. 17 illustrates calculation results of a local deterministic method after the enhancement of the UPE method according to one embodiment.

As a numerical illustration, a TNK problem is used to demonstrate the effectiveness of the above hybrid framework. We select 80 initial particles in Stage I to calculate Pareto-optimal solutions. FIG. 17 shows the calculation process of the disclosed method. Light-colored points are the user-oriented feasible points obtained by Stage 2. The dark-colored points are the nearby Pareto solutions in the neighborhood of each feasible solution (light-colored points), which are found by the modified NNC method. The computation time is 58.161587 seconds. FIG. 18 is the targeted Pareto-optimal front. It is observed that a well-distributed Pareto front can be calculated by this hybrid method.

Figure 19:
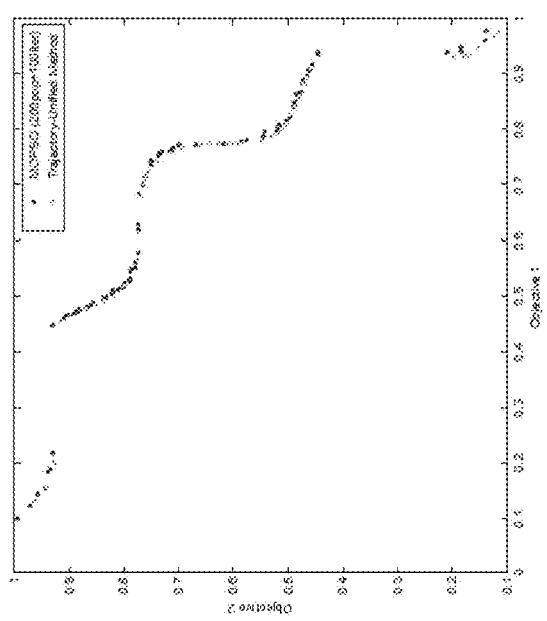
FIG. 19 is a comparison result between the MOPSO method and a disclosed hybrid method according to one embodiment.

To demonstrate the accuracy of this hybrid method, the test problem is also solved by the MOPSO method. FIG. 19 shows the comparison results of the two different methods. The Pareto front, composed by dark-colored points, is calculated by the MOPSO method with a population of 200, while the Pareto front in light-colored points is calculated by the disclosed method (referred to in FIG. 19 as the Trajectory-Unified Method). It is observed that the disclosed method can achieve higher accuracy than the MOPSO method. It is noted that when we calculate 50 Pareto-optimal solutions, the computation time drops to 19.932320 seconds, while the computation time for MOPSO with 200 populations and 100 iterations is 102.58 seconds. Thus, a well-defined user wish list is of much importance in the MOO problem, in the sense that the calculation of targeted Pareto-optimal solutions is more efficient.

APPLICATION TO OPTIMAL POWER FLOW PROBLEM. The disclosed methods are practical and applicable to large-scale nonlinear constrained multi-objective optimization problems. An optimal power flow (OPF) problem in power systems is utilized here to illustrate the effectiveness of the disclosed methods. The OPF problem is an important tool for modeling power systems operations.

The conventional OPF problem is to solve for an operation solution to minimize the total electrical energy cost. Over the past few years, rising concerns over the environmental effect of fossil fuel forced the utilities to modify their operation strategies for generation of electrical power not only at minimum total electrical energy costs, but also with minimum total pollution levels. Thus, considering the emission objective in addition to the cost function, an OPF problem can be formulated as a multi-objective nonlinear optimization problem.

As a numerical illustration, a 3-generator, 9-node power system is employed to demonstrate the effectiveness of the disclosed methods in a real-world application. The control variable u is a 6*1 vector of generator real and reactive power injections $P_G$ and $Q_G$. The state variable x consists of a 9*1 vector of voltage angles θ and a 9*1 vector of voltage magnitude V. The mathematical multi-objective formulation of the OPF problem in a 3-generator, 9-node power system is presented as follows:

$$\min f_1 = \sum_{i=1}^{3} (a_i + b_i P_{Gi} + c_i P_{Gi}^2) \quad (27a)$$

$$\min f_2 = \sum_{i=1}^{3} 10^{-2}(\gamma_i P_{Gi}^2 + \beta_i P_{Gi} + \alpha_i) + \xi_i \exp(\lambda_i P_{Gi})$$

subject to the following nonlinear power flow equations:

$$P_{Gi} - P_{Li} - V_i \sum_{j \in i} V_j(G_{ij} \cos\theta_{ij} + B_{ij} \sin\theta_{ij}) = 0, i = 1, \ldots, N_B \quad (27b)$$

$$Q_{Gi} - Q_{Li} - V_i \sum_{j \in i} V_j(G_{ij} \cos\theta_{ij} + B_{ij} \sin\theta_{ij}) = 0, i = 1, \ldots, N_B$$

and the following system constraints such as engineering and operational constraints:

$$V_i^{max} \leq V_i \leq V_i^{max}, i=1, \ldots, n_b \quad (27c)$$

$$P_{Gi}^{min} \leq P_{Gi} \leq P_{Gi}^{max}, i=1, \ldots, n_g \quad (27d)$$

$$Q_{Gi}^{min} \leq Q_{Gi} \leq Q_{Gm}^{max}, i=1, \ldots, n_g \quad (27e)$$

As where $a_i$, $b_i$, $c_i$ are generation cost coefficients of the ith generator, $\alpha_i$, $\beta_i$, $\gamma_i$, $\xi_i \Delta_i$ are coefficients of the ith generator emission characteristics. $P_{gi}$ and $Q_{gi}$ are the active and reactive power output of ith generator. The detailed data is given in Table II. Equations (27a) are the two objectives of electrical energy cost and pollution emission level. Equations (27b) are the AC power flow equations, Equations (27c) are the operation limits on the voltage magnitudes, and Equations (27d-27e) are the real and reactive power that can be generated by generators (i.e., engineering limits).

Based on the UPE method disclosed herein, a corresponding quotient gradient system is constructed based on Equations (27b)-(27e), where the stable equilibrium manifolds of the quotient gradient system equal to the feasible region of the OPF problem. The targeted Pareto-optimal solution is solved by the iterative UPE method.

In order to evaluate the effectiveness of the disclosed method, we compare the disclosed method with existing EAs with constraint handling techniques. Of all the existing state-of-the-art constraint handling techniques, penalty functions and their variations are simple and the most popular. The fitness of an infeasible individual is penalized by an amount proportional to its total constraint violation. A self-adaptive penalty function strategy is utilized and the basic form of a modified fitness function with penalty term is defined as:

$$F(x) = f(x) \pm \left[ \sum_{i=1}^{p} r_i \times \phi_i + \sum_{j=1}^{p} c_j \times L_j \right]$$

The constrained multi-objective OPF problem is separately solved by the hybrid UPE method and the MOPSO algorithm with the penalty function strategy. We compare the two methods in terms of solving process, computation time and solution accuracy. The search process of these two methods are monitored until the first feasible solution is found. From the same initial point, it is clearly demonstrated that the UPE guided EA method is more efficient since it can find a feasible solution near the initial point.

APPLICATION TO MACHINE LEARNING. Machine learning usually has to achieve multiple targets, which are often conflicting with each other. For instance, the task of feature selection involves minimizing the number of features and maximizing feature quality which are

TABLE II

GENERATION COST AND EMISSION COEFFICIENTS FOR IEEE 9-BUS TEST SYSTEM

|   | G1 | G2 | G3 |
|---|---|---|---|
|   | Fuel cost coefficient | | |
| a | 100 | 120 | 40 |
| b | 200 | 150 | 180 |
| c | 10 | 10 | 30 |
|   | Emission coefficient | | |
| γ | 0.0649 | 0.0564 | 0.0459 |
| β | −0.056 | −0.061 | −0.051 |
| α | 0.0409 | 0.0254 | 0.04258 |
| ζ | 2e−3 | 5e−4 | 1e−6 |
| λ | 2.857 | 3.333 | 8.000 | two conflicting objectives. It is also well recognized that the model selection in machine learning has to deal with some trade-off between model complexity and approximation or classification accuracy. The iterative UPE method and the hybrid UPE method can be applied to solve multiple Pareto-optimal solutions for various topics in machine learning. The two multi-objective methods can address the following main aspects in machine learning: multi-objective clustering, feature extraction and feature selection; multi-objective model selection to improve the performance of learning models, such as neural networks, support vector machines, decision trees, and fuzzy systems; multi-objective model selection to improve the interpretability of learning models, e.g., to extract symbolic rules from neural networks, or to improve the interpretability of fuzzy systems; multi-objective generation of ensembles; and multi-objective learning to deal with tradeoffs between plasticity and stability, long-term and short-term memories, specialization and generalization. Multi-objective learning deals with tradeoffs between plasticity and stability, long-term and short-term memories, specialization and generalization.

Taking supervised learning as an example, a single-objective learning algorithm often minimizes the mean squared error (MSE) on the training data. However, a learning model should not only have good approximation performance on the training data, but also good performance on unseen data. However, this target cannot be achieved by minimizing the single objective (28) or any other similar error measures; the comprehensibility or interpretability of the learned model should also be taken into account, such as the number of free parameters in the model. Thus the machine learning problems are formulated as multi-objective function; such as the following:

$$f_1 = E = \frac{1}{N}\sum_{i=1}^{N} (y(i) - y^d(i))^2 \quad (28)$$

$$f_2 = \Omega = \sum_{i=1}^{M} w_i^2 \quad (29)$$

where y(i) and $y^d$(i) are the model output and the desired output, respectively, and N is the number of data pairs in the training data. $w_i$, i=1, . . . , M is a weight in the neural model, and M is the number of weights in total. The most popular error measure is the mean squared error (MSE) defined in (28) on the training data. $\Omega$ is the sum of the squared weights, which represents the complexity of a neural network model.

To solve the multi-objective machine learning problems, either the iterative UPE method or the hybrid UPE method can be applied to solve the targeted Pareto-optimal solutions. First of all, a user wish list is defined by the users for a desired objective value range. Then either of the two disclosed method can be used to solve targeted Pareto optimal solutions. The difference between the two disclosed methods is that the iterative UPE method is suitable for fast calculating a targeted solution in a user-preferred region in the objective space, while the hybrid UPE method have better performance in detecting the targeted Pareto front.

Figure 20:
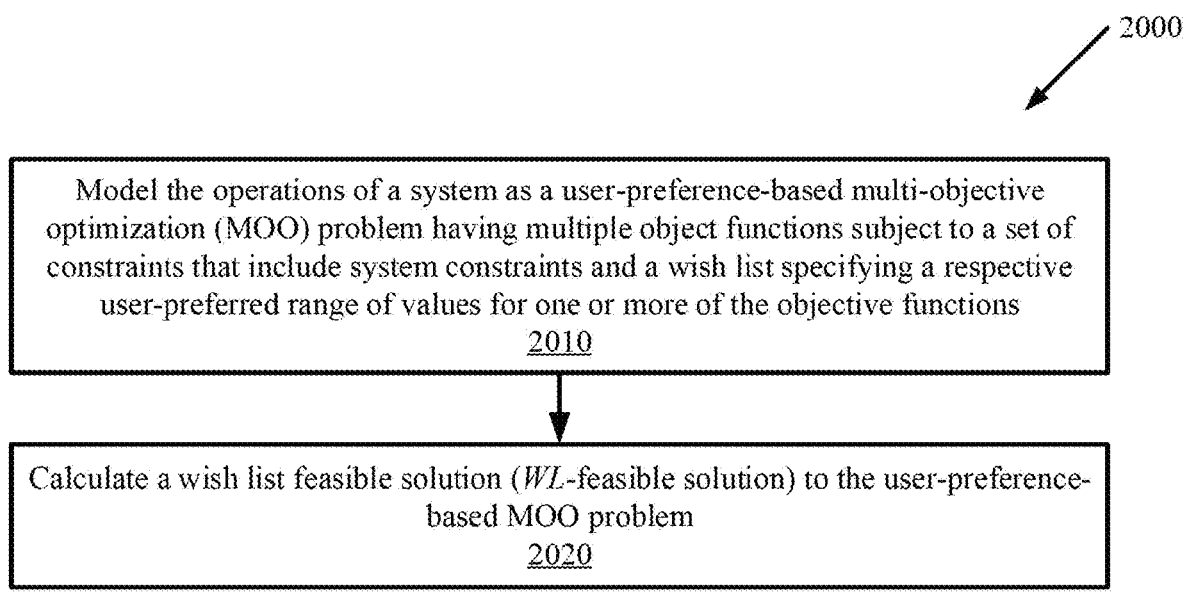
FIG. 20 illustrates a flowchart of a UPE method according to one embodiment.

FIG. 20 illustrates a flowchart of a user-preference-enabling (UPE) method 2000 that optimizes operations of a system based on user preferences. In one embodiment, the UPE method 2000 begins at step 2010 with modeling the operations of the system as a user-preference-based multi-objective optimization (MOO) problem having multiple object functions subject to a set of constraints. The set of constraints include system constraints and a wish list specifying a respective user-preferred range of values for one or more of the objective functions. At step 2020, a wish list feasible solution (WL-feasible solution) to the user-preference-based MOO problem is calculated.

Figure 21:
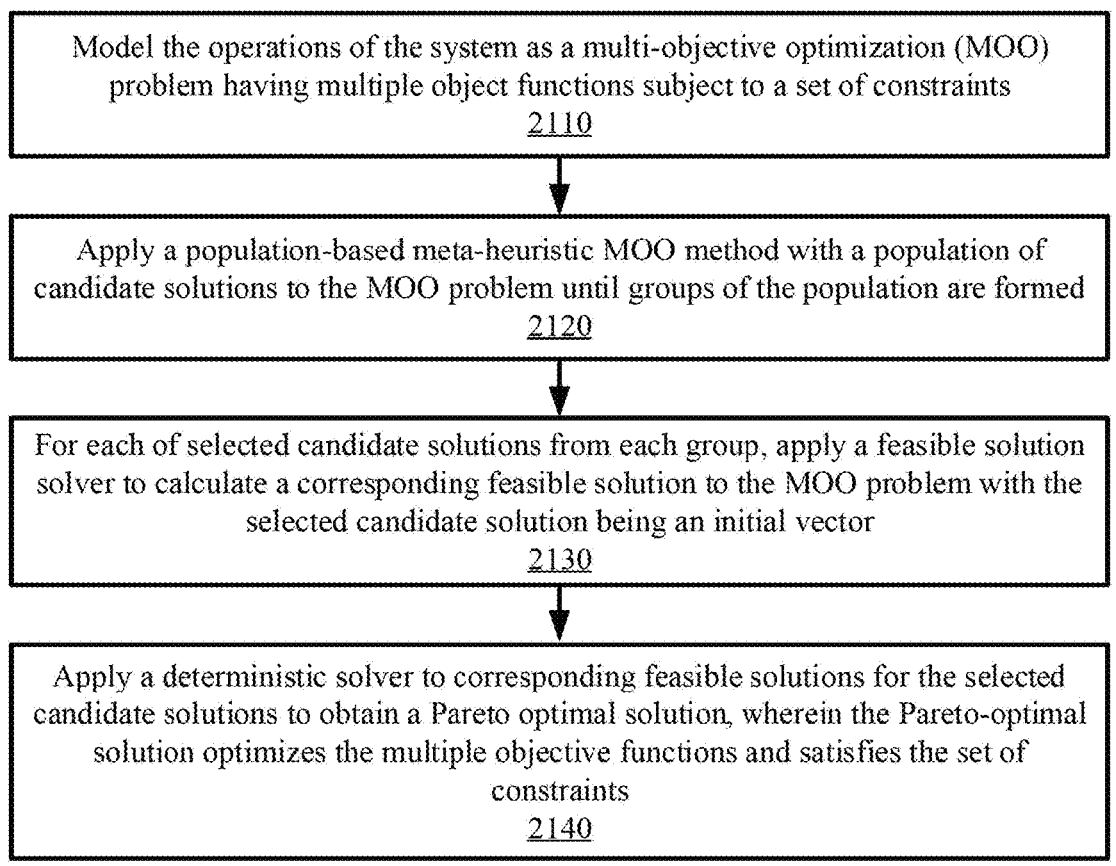
FIG. 21 illustrates a flowchart of a hybrid method according to one embodiment.

FIG. 21 illustrates a flowchart of a hybrid method 2100 that optimizes operations of a system. The method 2100 begins at step 2110 with modeling the operations of the system as a multi-objective optimization (MOO) problem having multiple object functions subject to a set of constraints. At step 2120, a population-based meta-heuristic MOO method with a population of candidate solutions is applied to the MOO problem until groups of the population are formed. For each of selected candidate solutions from each group, at step 2130 a feasible solution solver is applied to calculate a corresponding feasible solution to the MOO problem with the selected candidate solution being an initial vector. At step 2140, a deterministic solver is applied to corresponding feasible solutions for the selected candidate solutions to obtain a Pareto optimal solution. The Pareto-optimal solution optimizes the multiple objective functions and satisfies the set of constraints.

One or more parts of an embodiment of the invention may be implemented using different combinations of software, firmware, and/or hardware. In one embodiment, the methods described herein may be performed by a processing system. One example of a processing system is a computing system 2200 of FIG. 22.

Figure 22:
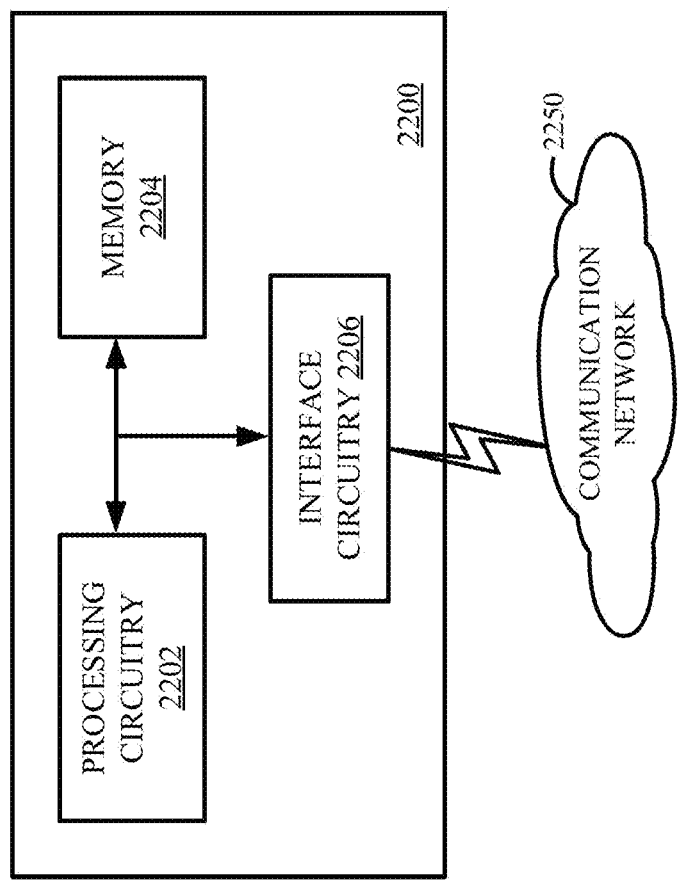
FIG. 22 is a block diagram of a computing system according to one embodiment.

Referring to FIG. 22, the computing system 2200 may be a server computer, or any machine capable of executing a set of instructions (sequential or otherwise) that specify actions to be taken by that machine. While only a single machine is illustrated, the term "machine" shall also be taken to include any collection of machines (e.g., computers) that individually or jointly execute a set (or multiple sets) of instructions to perform any one or more of the methodologies discussed herein. In one embodiment, the computing system 2200 includes circuitry which further includes processing circuitry 2202, a memory 2204 or instruction repository, and interface circuitry 2206. The interface circuitry 2200 can include at least one input port and at least one output port. The memory 2204 contains instructions executable by the processing circuitry 2302 whereby the computing system 2200 is operable to perform the various embodiments as described herein, including the method 2000 of FIG. 20 and the method 2100 of FIG. 21, as well as the other methods described herein. In one embodiment, a part or all of the data and code for performing the various embodiments described herein may be received over a communication network 2250 via the network interface device 2206.

Embodiments may be represented as a software product stored in a machine-readable medium (such as the non-transitory machine readable storage media, also referred to as a computer-readable medium, a processor-readable medium, or a computer usable medium having a computer readable program code embodied therein). The non-transitory machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile) such as hard drive or solid state drive, or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described embodiments may also be stored on the machine-readable medium. Software running from the machine-readable medium may interface with circuitry to perform the described tasks.

While the invention has been described in terms of several embodiments, those skilled in the art will recognize that the invention is not limited to the embodiments described and can be practiced with modification and alteration within the spirit and scope of the appended claims. The description is thus to be regarded as illustrative instead of limiting.

What is claimed is:
1. A computer-implemented user-preference-enabling (UPE) method that optimizes operations of a system based on user preferences, comprising:
modeling the operations of the system as a user-preference-based multi-objective optimization (MOO) problem having multiple object functions subject to a set of constraints that include system constraints and a wish list specifying a respective user-preferred range of values for one or more of the objective functions; and calculating a wish list feasible solution (WL-feasible solution) to the user-preference-based MOO problem, wherein the WL-feasible solution optimizes electrical power output in a power system, and wherein calculating the WL-feasible solution further comprises:
constructing a nonlinear non-hyperbolic dynamical system based on the set of constraints;
integrating the nonlinear non-hyperbolic dynamical system starting from an initial point to obtain a corresponding ω-limit point of a system trajectory;
evaluating an equality constraint set, which is formed from both equality constraints and inequality constraints in the set of constraints, over the corresponding ω-limit point;
comparing a result of evaluating the equality constraint set with a predetermined tolerance value to determine whether the WL-feasible solution exists; and
in response to a determination that the WL-feasible solution exists, solving the equality constraint set over the ω-limit point to obtain the WL-feasible solution.

2. The method of claim 1, further comprising:
updating the wish list by a user based on the calculated WL-feasible solution, to obtain an updated user-preference-based MOO problem; and
iteratively calculating a sequence of WL-feasible solutions to a sequence of updated user-preference-based MOO problems.

3. The method of claim 2, wherein iteratively calculating further comprises:
obtaining a targeted Pareto-optimal solution to the user-preference-based MOO problem based on the sequence of WL-feasible solutions, wherein the targeted Pareto-optimal solution optimizes the multiple objective functions and satisfies the set of constraints.

4. A computer-implemented user-preference-enabling (UPE) method that optimizes operations of a system based on user preferences, comprising:
modeling the operations of the system as a user-preference-based multi-objective optimization (MOO) problem having multiple object functions subject to a set of constraints that include system constraints and a wish list specifying a respective user-preferred range of values for one or more of the objective functions;
calculating a wish list feasible solution (WL-feasible solution) to the user-preference-based MOO problem; and
updating the wish list by a user based on the calculated WL-feasible solution, to obtain an updated user-preference-based MOO problem,
wherein the WL-feasible solution optimizes electrical power output in a power system, and wherein updating the wish list further comprises:
iteratively scaling down user-preferred ranges of values specified in the wish list until a degenerate stable equilibrium manifold (SEM) is found; and
using the degenerate SEM solution to scale up the user-preferred ranges of values, which cause non-existence of the WL-feasible solution, until a terminal condition is satisfied.

5. The method of claim 1, wherein calculating the WL-feasible solution further comprises:
constructing the nonlinear non-hyperbolic system based on the set of constraints, wherein a stable equilibrium manifold (SEM) of the nonlinear non-hyperbolic dynamical system corresponds to a feasible component of the user-preference-based MOO problem; and
locating the SEM of the nonlinear non-hyperbolic dynamical system to find the WL-feasible solution to the user-preference-based MOO problem.

6. The method of claim 5, wherein the nonlinear non-hyperbolic dynamical system belongs to a class of nonlinear non-hyperbolic dynamical systems satisfying a requirement that specifies: a set is a regular SEM of the nonlinear non-hyperbolic dynamical system if and only if the set is the feasible component of a feasible region of the user-preference-based MOO problem.

7. The method of claim 5, wherein the nonlinear non-hyperbolic dynamical system is a quotient gradient system.

8. The method of claim 1, wherein integrating the nonlinear non-hyperbolic dynamical system further comprises:
determining whether the system trajectory of the nonlinear non-hyperbolic dynamical system converges to a non-degenerate SEM, wherein the non-degenerate SEM is the WL-feasible solution.

9. The method of claim 1, further comprising:
applying a population-based meta-heuristic MOO method with a population of candidate solutions to the user-preference-based MOO problem until groups of the population are formed;
for each of selected candidate solutions from each group, applying the user-preference-enabling method to calculate a corresponding WL-feasible solution to the user-preference-based MOO problem with the selected candidate solution being an initial vector; and
applying a deterministic solver to corresponding feasible solutions for the selected candidate solutions to obtain a Pareto optimal solution, wherein the Pareto-optimal solution optimizes the multiple objective functions and satisfies the set of constraints.

10. The method of claim 9, wherein the population-based meta-heuristic MOO method is based on a multi-objective evolutionary algorithm.

11. The method of claim 9, wherein the population-based meta-heuristic MOO method is based on a multiple objective particle swarm optimization (MOPSO) method.

12. The method of claim 9, wherein the deterministic solver is the normalized normal constraint method.

13. The method of claim 9, wherein the Pareto-optimal solution is a targeted Pareto-optimal solution, whose objective vectors lie within a user-preferred range.

14. The method of claim 9, further comprising:
calculating a WL-feasible solution for each selected candidate solution in the populations;
applying one or more objective values of WL-feasible solutions to refine the wish list;
calculating new solutions that satisfy the refined wish list based on the WL-feasible solutions; and
for each new solution, applying a deterministic MOO method to compute a nearby targeted Pareto-optimal solution of the MOO problem.

15. A computer-implemented hybrid method that optimizes operations of a system, comprising:
modeling the operations of the system as a multi-objective optimization (MOO) problem having multiple object functions subject to a set of constraints;
applying a population-based meta-heuristic MOO method with a population of candidate solutions to the MOO problem until groups of the population are formed;
for each of selected candidate solutions from each group, applying a feasible solution solver to calculate a corresponding feasible solution to the MOO problem with the selected candidate solution being an initial vector; and applying a deterministic solver to corresponding feasible solutions for the selected candidate solutions to obtain a Pareto optimal solution, wherein the Pareto-optimal solution optimizes the multiple objective functions and satisfies the set of constraints to thereby optimize electrical power output in a power system, wherein applying the feasible solution solver further comprises:

constructing a nonlinear non-hyperbolic dynamical system based on the set of constraints;

integrating the nonlinear non-hyperbolic dynamical system starting from an initial point to obtain a corresponding ω-limit point of a system trajectory;

evaluating an equality constraint set, which is formed from both equality constraints and inequality constraints in the set of constraints, over the corresponding ω-limit point;

comparing a result of evaluating the equality constraint set with a predetermined tolerance value to determine whether the corresponding feasible solution exists; and in response to a determination that the corresponding feasible solution exists, solving the equality constraint set over the ω-limit point to obtain the corresponding feasible solution.

16. The method of claim 15, wherein the population-based meta-heuristic MOO method is based on an evolutionary algorithm.

17. The method of claim 15, wherein the population-based meta-heuristic MOO method is based on a multiple objective particle swarm optimization (MOPSO) method.

18. The method of claim 15, wherein the deterministic solver is the normalized normal constraint method.

19. The method of claim 15, wherein the feasible solution solver comprising:

constructing the nonlinear non-hyperbolic dynamical system based on the set of constraints, wherein a stable equilibrium manifold (SEM) of the nonlinear non-hyperbolic dynamical system corresponds to a feasible component of the MOO problem; and locating the SEM of the nonlinear non-hyperbolic dynamical system to find the feasible solution to the MOO problem.

20. The method of claim 19, wherein the nonlinear non-hyperbolic dynamical system belongs to a class of nonlinear non-hyperbolic dynamical systems satisfying a requirement that specifies: a set is a regular SEM of the nonlinear non-hyperbolic dynamical system if and only if the set is the feasible component of a feasible region of the MOO problem.

21. The method of claim 19, wherein the nonlinear non-hyperbolic dynamical system is a quotient gradient system.

22. The method of claim 19, wherein integrating the nonlinear non-hyperbolic dynamical system further comprises:

determining whether the system trajectory of the nonlinear non-hyperbolic dynamical system converges to a non-degenerate SEM, wherein the non-degenerate SEM is a feasible solution.

23. A computer-implemented user-preference-enabling (UPE) method that optimizes operations of a system based on user preferences, comprising:

modeling the operations of the system as a user-preference-based multi-objective optimization (MOO) problem having multiple object functions subject to a set of constraints that include system constraints and a wish list specifying a respective user-preferred range of values for one or more of the objective functions; and calculating a wish list feasible solution (WL-feasible solution) to the user-preference-based MOO problem, wherein the WL-feasible solution optimizes, in a machine learning system, one or more of: clustering, feature extraction, feature selection, model selection, and ensemble generation, and wherein calculating the WL-feasible solution further comprises:

constructing a nonlinear non-hyperbolic dynamical system based on the set of constraints;

integrating the nonlinear non-hyperbolic dynamical system starting from an initial point to obtain a corresponding ω-limit point of a system trajectory;

evaluating an equality constraint set, which is formed from both equality constraints and inequality constraints in the set of constraints, over the corresponding ω-limit point;

comparing a result of evaluating the equality constraint set with a predetermined tolerance value to determine whether the WL-feasible solution exists; and in response to a determination that the WL-feasible solution exists, solving the equality constraint set over the ω-limit point to obtain the WL-feasible solution.

24. The method of claim 23, further comprising:

updating the wish list by a user based on the calculated WL-feasible solution, to obtain an updated user-preference-based MOO problem; and iteratively calculating a sequence of WL-feasible solutions to a sequence of updated user-preference-based MOO problems.

25. The method of claim 24, further comprising:

obtaining a targeted Pareto-optimal solution to the user-preference-based MOO problem based on the sequence of WL-feasible solutions, wherein the targeted Pareto-optimal solution optimizes the multiple objective functions and satisfies the set of constraints.

26. The method of claim 23, further comprising:

constructing the nonlinear non-hyperbolic dynamical system based on the set of constraints, wherein a stable equilibrium manifold (SEM) of the nonlinear non-hyperbolic dynamical system corresponds to a feasible component of the user-preference-based MOO problem; and locating the SEM of the nonlinear non-hyperbolic dynamical system to find the WL-feasible solution to the user-preference-based MOO problem.

27. The method of claim 23, further comprising:

iteratively scaling down user-preferred ranges of values specified in the wish list until no feasible solution is found; and scaling up the user-preferred ranges of values until a terminal condition is satisfied.

* * * * *